United States Patent
Watanabe et al.

(10) Patent No.: US 7,464,223 B2
(45) Date of Patent: *Dec. 9, 2008

(54) STORAGE SYSTEM INCLUDING STORAGE ADAPTERS, A MONITORING COMPUTER AND EXTERNAL STORAGE

(75) Inventors: Yasuo Watanabe, Tokyo (JP);
Yasutomo Yamamoto, Tokyo (JP);
Kazuhisa Fujimoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/654,050

(22) Filed: Jan. 16, 2007

(65) Prior Publication Data

US 2007/0118694 A1 May 24, 2007

Related U.S. Application Data

(63) Continuation of application No. 10/845,409, filed on May 12, 2004, now Pat. No. 7,171,522.

(30) Foreign Application Priority Data

Mar. 23, 2004 (JP) ............................. 2004-084229

(51) Int. Cl.
*G06F 12/00* (2006.01)
(52) U.S. Cl. ........................ 711/114; 711/119; 711/129; 711/170; 711/171; 709/219
(58) Field of Classification Search .................. 711/144, 711/119, 170, 145, 120, 129, 171; 709/219, 709/224, 226; 370/351, 242; 718/105; 710/220
See application file for complete search history.

(56) References Cited

U.S. PATENT DOCUMENTS 5,987,569 A * 11/1999 Takahashi et al. ........... 711/119

6,105,116 A 8/2000 Mori (Continued)

FOREIGN PATENT DOCUMENTS

JP 10-283272 10/1998

OTHER PUBLICATIONS

Harris et al. "iSeries and External Storage," IBM Corporation, White Plains, NY (2001).

*Primary Examiner*—Hong Kim
(74) *Attorney, Agent, or Firm*—Townsend and Townsend and Crew LLP

(57) ABSTRACT

A storage system having a cluster configuration that prevents a load from concentrating on a certain storage node and enhances access performance is disclosed. The storage system is provided with plural storage adaptors having a cache memory for storing data read/written according to an I/O request from a host and a device for holding the data stored in the cache memory, means for connecting an external storage having a logical device that handles the read/written data and a cache memory to the storage adaptor, means for monitoring and grasping a usage situation of each cache memory of the plural storage adaptors and means for referring to information of the usage situation of each cache memory acquired by the grasping means and selecting any of the storage adaptors so that usage of each cache memory is equalized, and the logical device of the external storage is controlled by the storage adaptor selected by the selection means via connection means.

10 Claims, 19 Drawing Sheets

U.S. PATENT DOCUMENTS

| | | |
|---|---|---|
| 6,256,740 B1 | 7/2001 | Muller et al. |
| 6,438,652 B1 * | 8/2002 | Jordan et al. ................ 711/120 |
| 6,487,634 B1 * | 11/2002 | Bachmat .................... 711/112 |
| 6,529,976 B1 | 3/2003 | Fukuzawa et al. |
| 6,675,264 B2 * | 1/2004 | Chen et al. .................. 711/141 |
| 6,950,848 B1 * | 9/2005 | Yousefi'zadeh ............. 709/203 |
| 7,096,319 B2 | 8/2006 | Mogi et al. |
| 7,293,156 B2 * | 11/2007 | Zohar et al. ................ 711/206 |
| 2003/0061448 A1 * | 3/2003 | Rawson, III ................ 711/133 |
| 2003/0159001 A1 | 8/2003 | Chalmer et al. |
| 2004/0049579 A1 * | 3/2004 | Ims et al. .................... 709/225 |
| 2004/0083289 A1 | 4/2004 | Karger et al. |
| 2004/0193803 A1 | 9/2004 | Mogi et al. |
| 2004/0257857 A1 | 12/2004 | Yamamoto et al. |
| 2005/0033804 A1 | 2/2005 | Iwami et al. |
| 2005/0050271 A1 * | 3/2005 | Honda et al. ................ 711/114 |
| 2005/0055435 A1 | 3/2005 | Gbadegesin et al. |

* cited by examiner

FIG. 6

204 UPPER LOGICAL DEVICE MANAGEMENT INFORMATION

CONFIGURATION INFORMATION OF UPPER LOGICAL DEVICE NO. 0:

| | |
|---|---|
| UPER LOGICAL DEVICE NUMBER | 601 |
| SIZE | 602 |
| SA NUMBER /LOWER LOGICAL DEVICE NUMBER | 603 |
| DEVICE STATE | 604 |
| PORT NUMBER, TARGET ID, LUN | 605 |
| CONNECTED HOST NAME | 606 |

FIG. 7

206 LU PATH MANAGEMENT INFORMATION

CONFIGURATION INFORMATION OF PORT NO. 0, TARGET ID NO. 0/LUN NO. 0:

| | |
|---|---|
| PORT NUMBER | 701 |
| TARGET ID, LUN | 702 |
| CORRESPONDING UPPER LOGICAL DEVICE NUMBER | 703 |
| CONNECTED HOST NAME | 704 |

FIG. 8

201 LOWER LOGICAL DEVICE MANAGEMENT INFORMATION

CONFIGURATION INFORMATION OF SA NO. 0/LOWER LOGICAL DEVICE NO. 0:

| | |
|---|---|
| SA NUMBER /LOWER LOGICAL DEVICE NUMBER | 801 |
| SIZE | 802 |
| CORRESPONDING PHYSICAL/EXTERNAL DEVICE NUMBER | 803 |
| DEVICE STATE | 804 |
| CORRESPONDING UPPER LOGICAL DEVICE NUMBER | 805 |

FIG. 9

202 PHYSICAL DEVICE MANAGEMENT INFORMATION

CONFIGURATION INFORMATION OF PHYSICAL DEVICE NO. 0:

| | |
|---|---|
| PHYSICAL DEVICE NUMBER | 901 |
| SIZE | 902 |
| CORRESPONDING LOWER LOGICAL DEVICE NUMBER | 903 |
| DEVICE STATE | 904 |
| RAID CONFIGURATION (RAID LEVEL, NUMBER OF DATA/PARITY) | 905 |
| STRIPE SIZE | 906 |
| DISK NUMBER LIST | 907 |
| START OFFSET IN DISK | 908 |
| SIZE IN DISK | 909 |

FIG. 10

205 EXTERNAL DEVICE MANAGEMENT INFORMATION

CONFIGURATION INFORMATION OF EXTERNAL DEVICE NO. 0:

| | |
|---|---|
| EXTERNAL DEVICE NUMBER | 1001 |
| SIZE | 1002 |
| SA NUMBER/LOWER LOGICAL DEVICE NUMBER | 1003 |
| DEVICE STATE | 1004 |
| STORAGE IDENTIFICATION INFORMATION | 1005 |
| DEVICE NUMBER IN EXTERNAL STORAGE | 1006 |
| PA NUMBER/INITIATOR PORT NUMBER LIST | 1007 |
| TARGET PORT ID/TARGET ID/LUN LIST | 1008 |

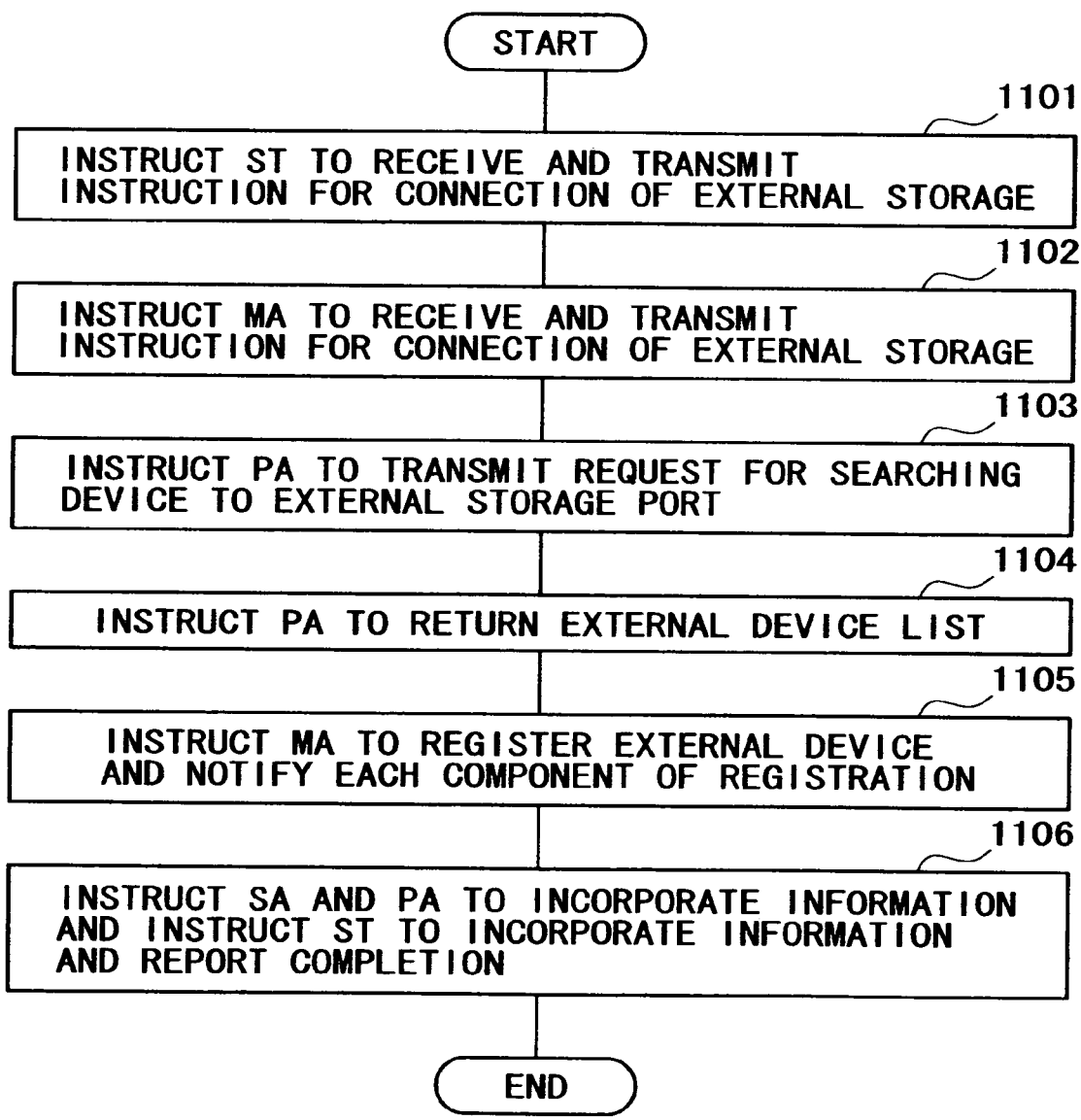

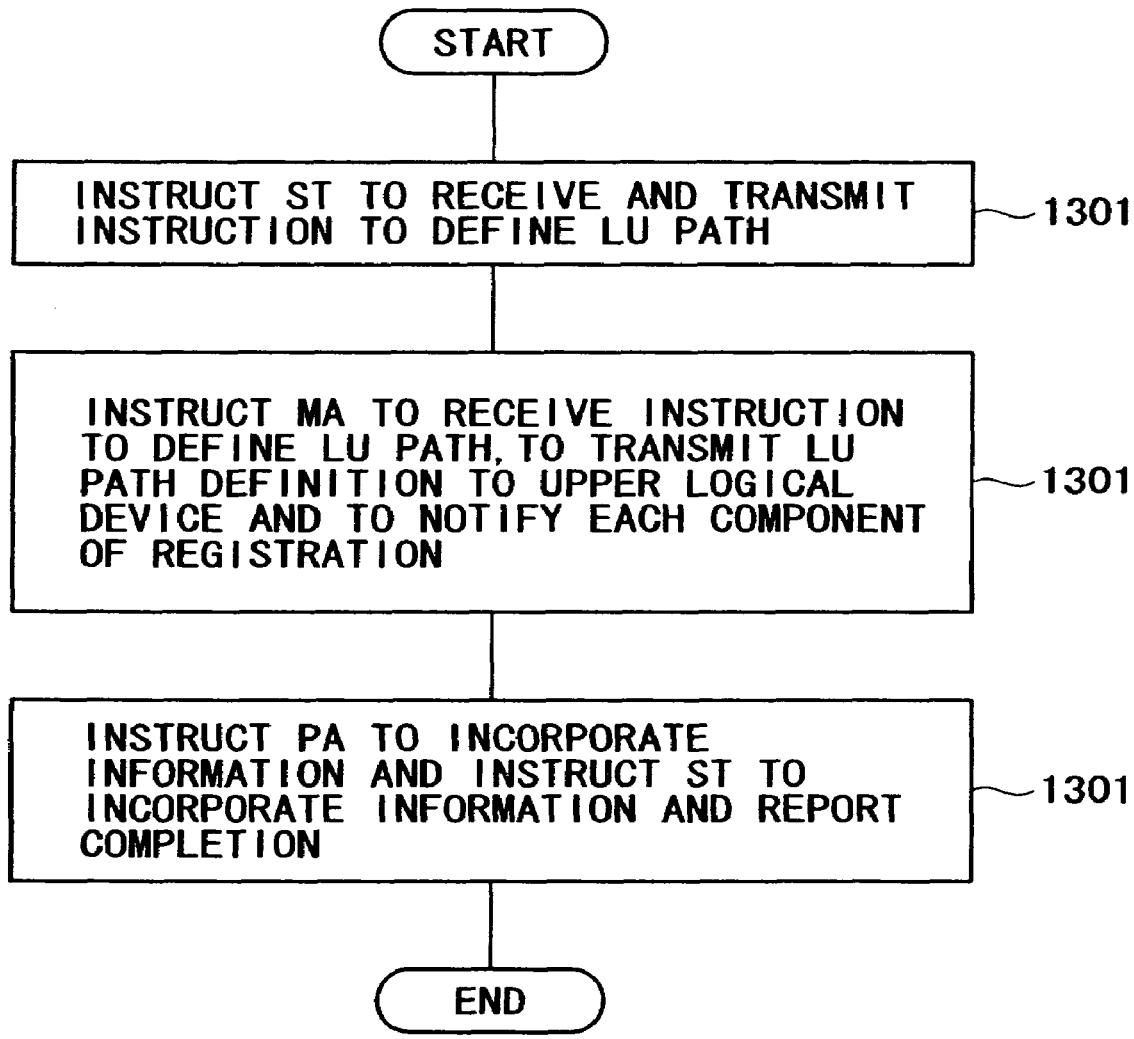

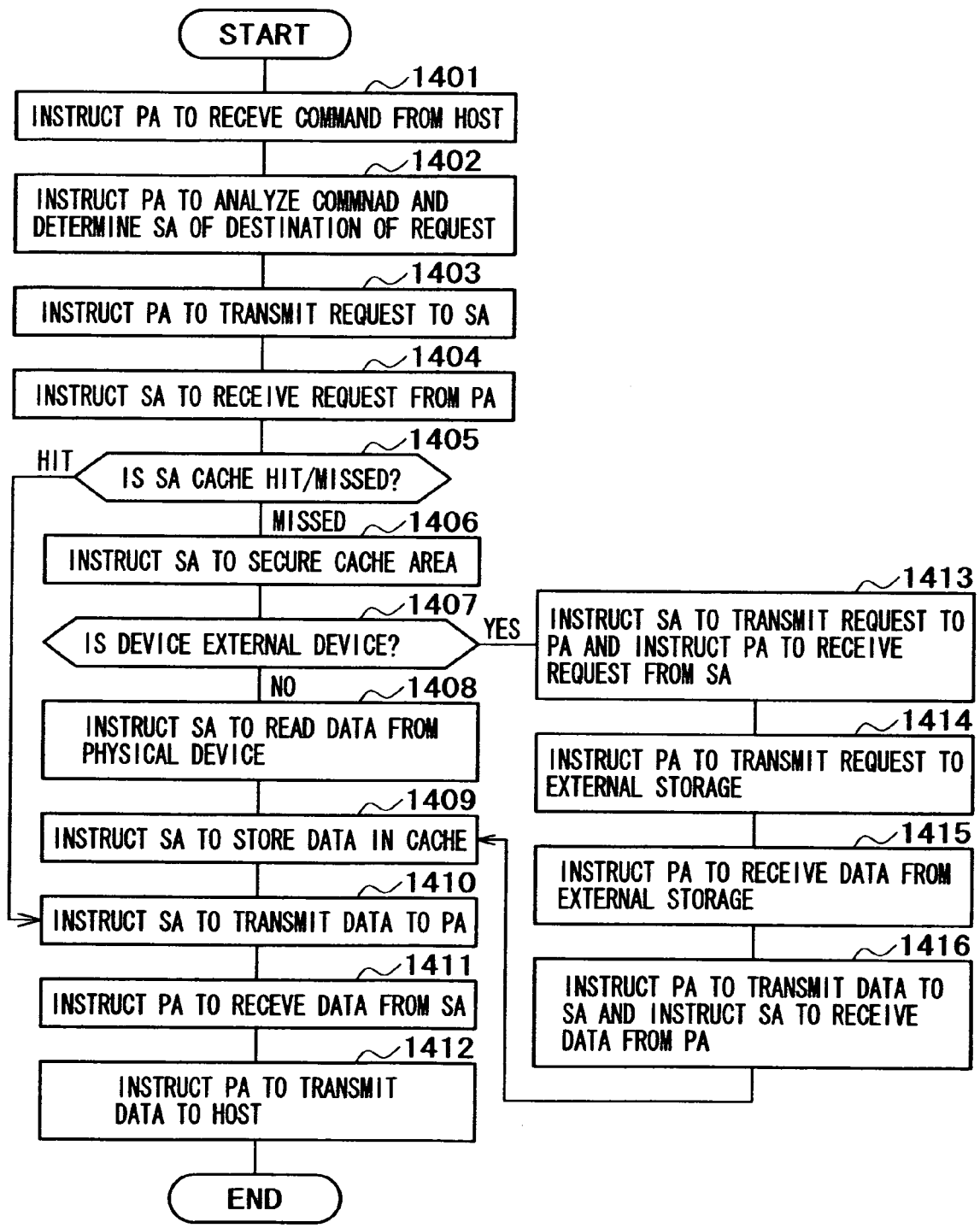

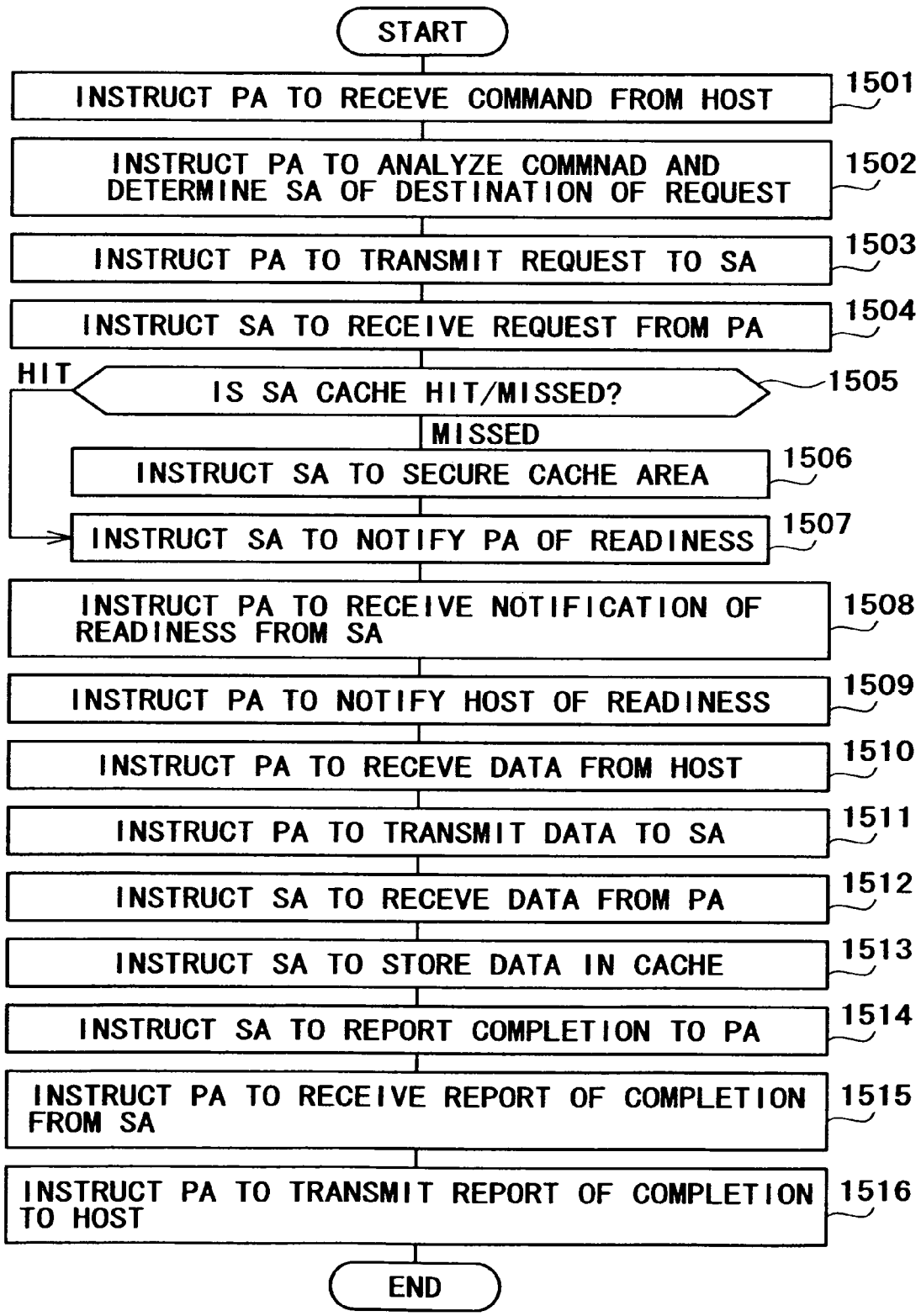

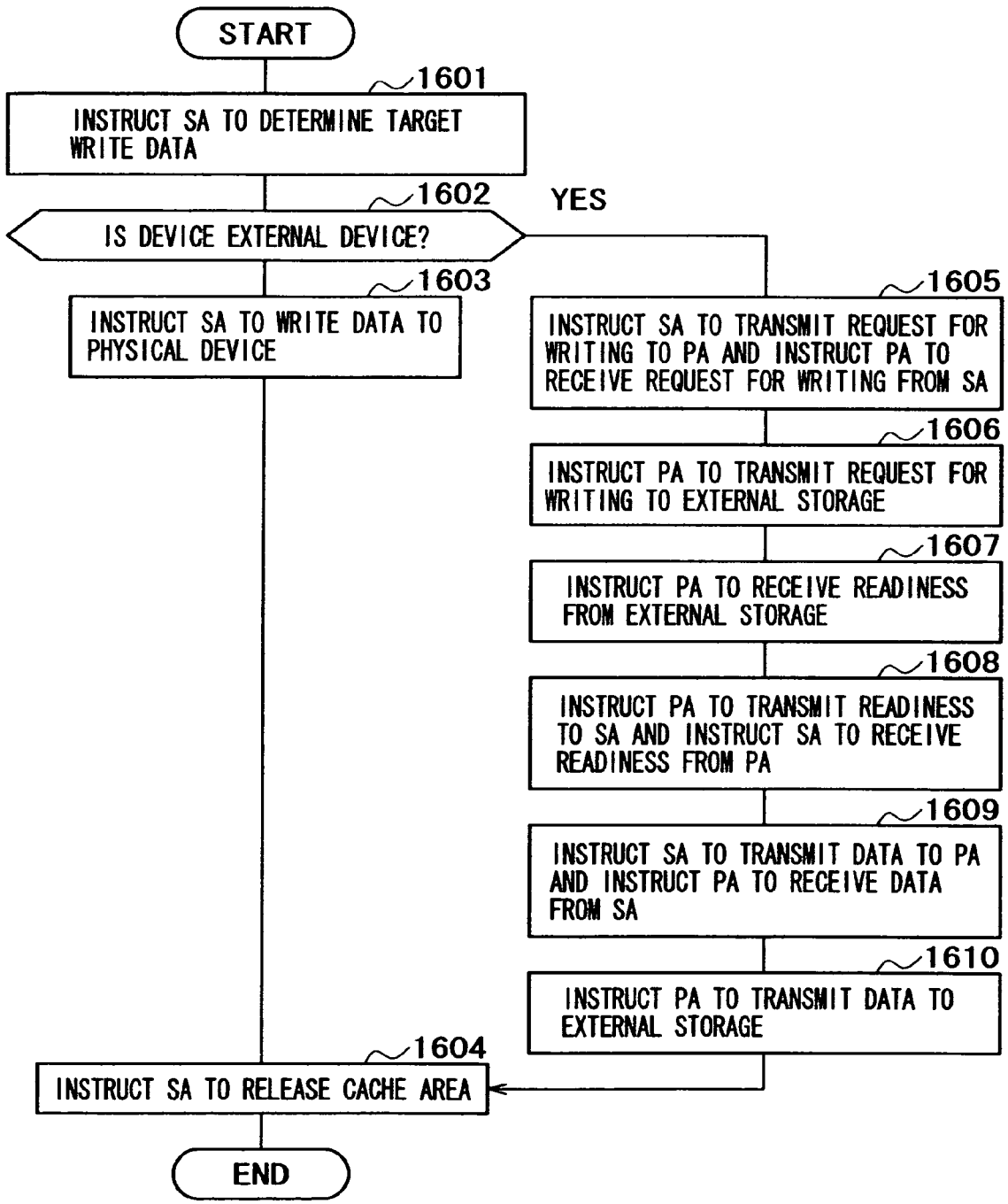

FIG. 17

204 UPPER LOGICAL DEVICE MANAGEMENT INFORMATION

CONFIGURATION INFORMATION OF UPPER LOGICAL DEVICE NO. 0:

| Field | Ref |
|---|---|
| UPPER LOGICAL DEVICE NUMBER | 601 |
| SIZE | 602 |
| SA NUMBER/LOWER LOGICAL DEVICE NUMBER | 603 |
| DEVICE STATE | 604 |
| PORT NUMBER, TARGET ID, LUN | 605 |
| CONNECTED HODT NAME | 606 |
| DEVICE ACCESS MODE | 607 |
| SWITCHING PROGRESS POINTER | 608 |
| : | 609 |

FIG. 18

201 LOWER LOGICAL DEVICE MANAGEMENT INFORMATION

CONFIGURATION INFORMATION OF LOWER LOGICAL DEVICE NO. 0:

| Field | Ref |
|---|---|
| LOWER LOGICAL DEVICE NUMBER | 801 |
| SIZE | 802 |
| CORRESPONDING PHYSICAL/EXTERNAL DEVICE NUMBER | 803 |
| DEVICE STATE | 804 |
| CORRESPONDING UPPER LOGICAL DEVICE NUMBER | 805 |
| SWITCHING PROGRESS POINTER | 806 |

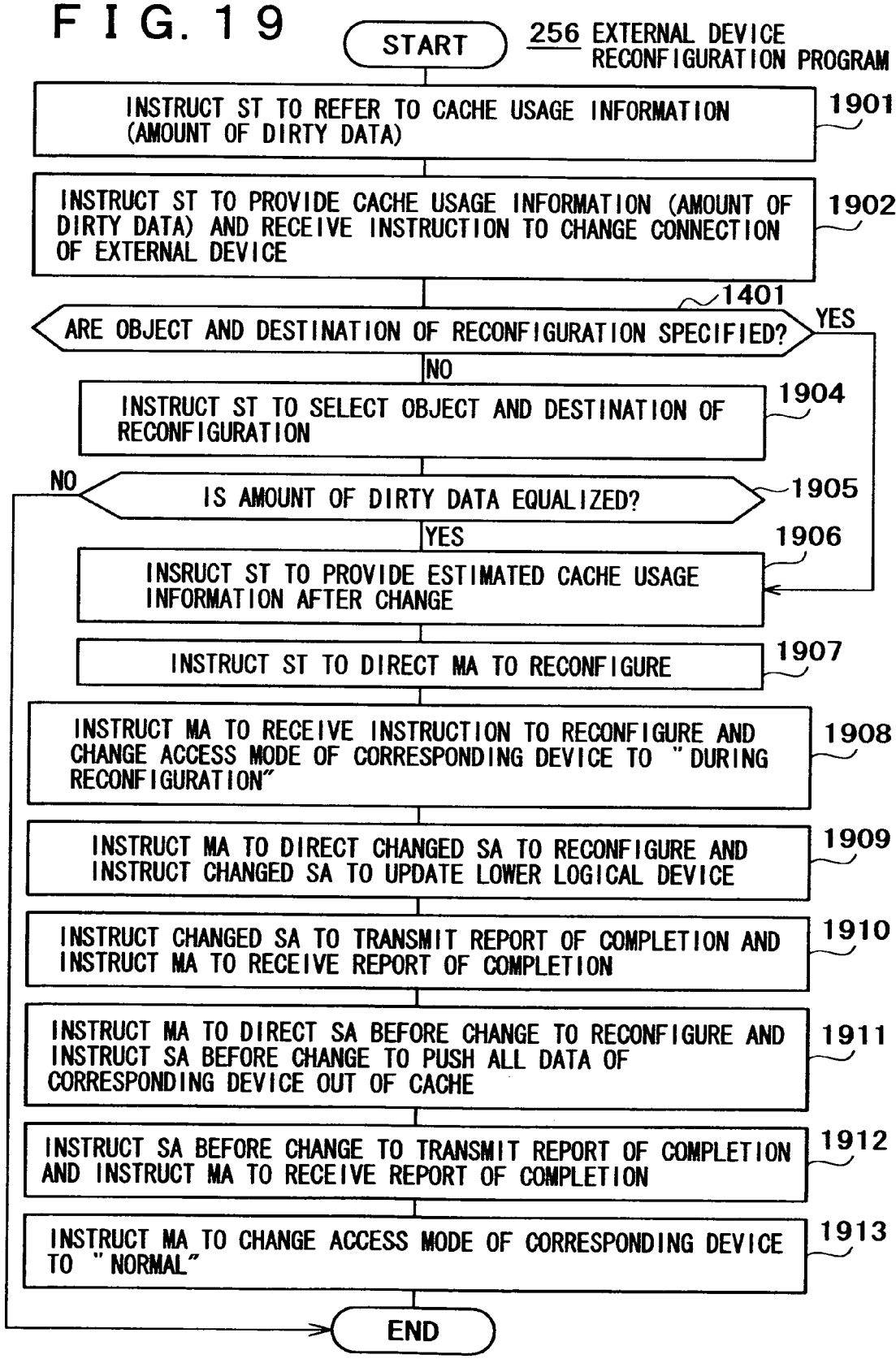

STORAGE SYSTEM INCLUDING STORAGE ADAPTERS, A MONITORING COMPUTER AND EXTERNAL STORAGE

The present application is a continuation of U.S. application Ser. No. 10/845,409, filed on May 12, 2004, now U.S. Pat. No. 7,171,522, which claims priority from Japanese application serial No. 2004-84229, filed on Mar. 23, 2004, the contents of which are hereby incorporated by reference into this application.

CLAIM OF PRIORITY

The present application claims priority from Japanese application serial No. 2004-84229, filed on Mar. 23, 2004 the content of which is hereby incorporated by reference into this application.

BACKGROUND OF THE INVENTION

The present invention relates to a storage system, particularly relates to control for dispersing a load in a storage system having cluster configuration and the control of a cache memory for it.

In an enterprise IT system, a mass and high-performance storage system is demanded.

To meet this demand, mass data can be processed by adopting plural storage systems of small storage capacity. However, as the number of storage systems increases, the increase of the management cost of the storage systems by failure, maintenance and others comes into question. In the meantime, there is also a method of providing a mass storage system by one storage system. However, in a conventional type storage system that a computer resource such as a memory, a control memory and an internal transfer mechanism is shared, and it is difficult to realize a currently demanded mass and high-performance storage system because of the cost and a technical reason.

To solve such a problem, in a specification of U.S. Pat. No. 6,256,740 for example, the application of cluster technique to a storage system is disclosed. The cluster technique has been mainly used for packaging technique for realizing great throughput in a field of a host computer such as a server. A large-scale storage system can be mounted at a relatively low cost by applying this technique to the storage system. Such a storage system is called a cluster storage system.

As for the cluster storage system, plural storage nodes of relatively small configuration are connected via an internal network and a mass single storage system is realized. An I/O request for the cluster storage system is portioned out between (among) storage nodes that hold target data and is processed in each storage node. At the storage node, a host interface, a disk device, a control processor, a memory, a control memory, a disk cache and others are mounted like a normal storage system and these are connected via the internal network at the storage node. At each storage node, an I/O request for the disk device is made using these.

Generally, when a large-scale cache memory and a large-scale control memory are managed as shared memory space, a broad-band internal network is required to correspond to mass access and the cost of a storage system increases. However, as the scale of a storage node is small, a load of access to a cache memory and a control memory is small and the cost of a storage system can be reduced. Therefore, a cluster storage system can realize a mass storage system at a low cost.

Besides, in JP-A-10-283272, there is disclosed a compound computing system in which data generated in an I/O subsystem of an open system is transferred to an I/O subsystem of a main frame to which the subsystem is not directly connected between the I/O subsystems different in an access interface and is backed up in a storage of the I/O subsystem of the main frame. A disk controller of the main frame is provided with a table showing whether or not an address of its storage is allocated to the I/O subsystem of the open system and allows access to the I/O subsystem of the open system by referring to this table.

SUMMARY OF THE INVENTION

In U.S. Pat. No. 6,256,740, technique for an I/O subsystem of an open system to use a storage of an I/O system of a main frame for an external storage is disclosed. However, no concrete disclosure for using the storage for a cluster storage system is made. Besides, when the I/O subsystem of the open system and the I/O system of the main frame are regarded as two storage subsystems, it is not suggested how the bias of a load caused by an access frequency in these subsystems is to be prevented.

It is considered that an external storage located outside is connected to a cluster storage system and functions provided by the cluster storage system are used in the external storage. To provide a function of a storage node to an external device of the external storage, a cache memory of any storage node is used. Therefore, when processing related to multiple external devices is concentrated on a certain storage node and when the processing of an external device the access frequency of which is high is executed, a cache memory is used in large quantity for the external device and access performance to devices in the storage node may be deteriorated. No countermeasure against the deterioration of access performance caused by unbalance in cache usage is disclosed in either of the above patent applications.

The object of the invention is to provide a storage system that prevents a load from concentrating at a certain storage node in a cluster storage system and can enhance access performance.

Another object of the invention is to provide a control method of a storage system and a cache memory for equalizing cache usage at each storage node in a cluster storage system that manages the connection of an external storage.

A cluster storage system according to the invention is provided with plural storage adaptors having a cache memory that stores data read/written according to an I/O request from a host and a device that holds the data stored in the cache memory, means having a logical device for dealing with read/written data and a cache memory for connecting an external storage to the storage adaptor, means for monitoring and grasping a usage situation of cache memories of the plural storage adaptors and means for referring to information related to the usage situation of the cache memories acquired by the grasping means and selecting any the storage adaptors so that usage of the cache memories is equalized, and is characterized in that the logical device of the external storage is controlled by the storage adaptor selected by the selection means via the connection means.

Desirably, the grasping means acquire an amount of dirty data (a first amount of dirty data) for each of the cache memories of the plural storage adaptors, the selection means select the storage adaptor having the smallest amount of dirty data, for example, the least amount of dirty data based upon the acquired amount of dirty data, and the logical device of the external storage is controlled.

Further, the grasping means grasp an amount of dirty data (a second amount of dirty data) which is data stored in the logical device of the external storage and which is stored in the cache memory with which any of the storage adaptors is provided and the selection means select the storage adaptor for controlling the logical device of the external storage based upon the first amount of dirty data and the second amount of dirty data.

Further, the cluster storage system according to the invention is provided with means for making an asynchronous remote copy of the data stored in the logical device of the external storage to another storage system and means for grasping an amount of data (side file data) held in the cache memory of the storage adaptor and not transmitted to the other storage yet, and the selection means refers to the amount of side file data acquired by the grasping means and selects the storage adaptor for controlling the logical device of the external storage.

Further, the cluster storage system according to the invention is provided with means for transferring the usage of the cache memory, the amount of dirty data or the amount of side file data acquired by the grasping means to a service terminal or a management server to provide it to a manager, and the selection means select the storage adaptor designated by the service terminal or the management server.

A storage system according to the invention is based upon the cluster storage system, is provided with plural storage nodes each of which is provided with a cache memory that temporarily stores data read/written according to an I/O request from a host and a device that holds the data stored in the cache memory, an interface for connecting an external storage having a cache memory that stores data read/written according to an I/O request from the host and a device with the storage node, means for monitoring and grasping a usage situation of each of the cache memories of the plural storage nodes and means for referring to information of the usage situation of the cache memories acquired by the grasping means and selecting a certain storage node so that usage of the cache memories is equalized, and is characterized in that the device of the external storage is controlled by the storage node selected by the selection means via the interface.

Desirably, the grasping means acquires an amount of dirty data (a first amount of dirty data) for each of the cache memories, the selection means select the storage node having a smaller amount of dirty data based upon the acquired amount of dirty data and controls the external storage.

Further, the storage system according to the invention is provided with means for making an asynchronous remote copy from a second storage including the plural storage nodes to a third storage and means for grasping an amount of data (side file data) held in the cache memory of the storage node and not transmitted to the third storage yet, the selection means refer to the amount of side file data acquired by the grasping means and select the storage node.

The storage system according to the invention is also provided with means for transferring the usage situation of the cache memory, the amount of dirty data or the amount of side file data acquired by the grasping means to a service terminal or a management server to provide it to a manager and the selection means select the storage node designated by the service terminal or the management server.

The invention is also grasped as a method of processing an I/O request from a host in a cluster storage system. That is, the invention relates to an I/O processing method provided with a step for processing an I/O request from a host in plural storage components each of which is provided with a device for storing the data and a cache memory that temporarily stores data stored in the device, a step for controlling a device of an external storage having the device that stores data and a cache memory by a certain storage part, a step for grasping a usage situation of cache memories in the plural storage parts, a step for referring to the information of the acquired usage situation of the cache memories and selecting the certain storage part so that usage of the cache memories is equalized and a step for processing an I/O request to the external storage from the host using the selected storage part.

In a desirable one example, in a cluster storage system, a storage node is divided into a protocol adaptor that controls a host interface and a storage adaptor that controls a disk device and a disk cache, and plural protocol adaptors and plural storage adaptors are connected via an internal network so that each component can be communicated with other all components. In the protocol adaptor, a host interface and a control processor that controls it are mounted and the protocol adaptor executes processing for allocating an I/O request received via the host interface to a storage adaptor to which a target device (a target disk device) belongs. In the storage adaptor, a disk device, a disk cache, a control processor, a memory and further, a control memory that stores control information required for I/O request processing to a device are mounted, the storage adaptor receives an I/O request transmitted from the protocol adaptor and transferred via the internal network and executes an I/O process to/from a target device. The control processor of the storage adaptor executes various processing for realizing a data link function such as data copying and data relocation. Correspondence between a logical device (hereinafter called an upper logical device) provided by the storage system and a logical device (hereinafter called a lower logical device) provided by each storage adaptor is managed by a management adaptor similarly connected to the internal network. The management adaptor also manages failure in the protocol adaptor and the storage adaptor in addition to device management. The internal network is a network inside the storage system that connects the protocol adaptor, the storage adaptor and the management adaptor and is used for exchanging access data of each device and control information between each component.

In this example, as the cache memory and the control memory are shared only between control processors in each storage adaptor, a memory band and a back-plane band for connecting a memory and a control processor are inhibited and the manufacturing cost can be reduced. Owing to the internal network, access from an arbitrary host interface with which an arbitrary protocol adaptor is provided to an arbitrary logical device in an arbitrary storage adaptor is enabled.

When the external storage is connected to the above mentioned cluster storage system, the external storage is connected to the host interface and the management adaptor manages correspondence between a device (an external device) in the external storage and a lower logical device. The storage adaptor also manages correspondence between the lower logical device and a physical device and adds information that can manage correspondence with the external device.

When a first storage which is an external storage is connected to a second storage system having the above mentioned cluster configuration and an external device is unified as a second storage device, a lower logical device is relates to an upper logical device after the external device is related to the lower logical device of a specific storage adaptor. This is called the allocation of the external device to the storage adaptor. The protocol adaptor that receives an I/O request to the upper logical device from a host via the host interface transfers the I/O request to the storage adaptor to which the lower logical device to which the upper logical device corresponds belongs.

When the external storage is connected to the above mentioned cluster storage system, the external storage connected to the protocol adaptor can communicate with an arbitrary storage adaptor. Therefore, processing related to the external device can be executed by the arbitrary storage adaptor. To enhance the performance of the whole cluster storage system at this time, the storage adaptor to which the external device is allocated is suitably selected out of plural storage adaptors. For a criterion of selection, cache usage in the storage adaptor is used and the storage adaptor the cache usage of which is the least is selected out of the plural storage adaptors.

Since the cache usage of the storage adaptor varies over time, the bias of cache usage occurs between/among plural storage adaptors. However, to equalize cache usage corresponding to the elapse of time between/among plural storage adaptors, the storage adaptor to which the external device is allocated is dynamically changed.

According to the invention, in the storage system provided with plural storage nodes forming the cluster storage system, a load can be prevented from concentrating on a certain storage node and the performance of access can be enhanced. Besides, cache usage in each storage node can be equalized and a load of the storage node can be dispersed.

BRIEF DESCRIPTION OF THE DRAWINGS

FIG. 6 shows the configuration of upper logical device management information in the first embodiment;

FIG. 7 shows the configuration of LU path management information in the first embodiment;

FIG. 8 shows the configuration of lower logical device management information in the first embodiment;

FIG. 9 shows the configuration of physical device management information in the first embodiment;

FIG. 10 shows the configuration of external device management information in the first embodiment;

FIG. 11 is a flowchart showing an external device definition program in the first embodiment;

FIG. 13 is a flowchart showing an LU path definition program in the first embodiment;

FIG. 14 is a flowchart showing a read command program in the first embodiment;

FIG. 15 is a flowchart showing a write command program in the first embodiment;

FIG. 16 is a flowchart showing an asynchronous destaging program in the first embodiment;

FIG. 17 shows the configuration of upper logical device management information in a second embodiment;

FIG. 18 shows the configuration of the upper logical device management information in the second embodiment;

FIG. 19 is a flowchart showing an external device reconfiguration program in the second embodiment;

DESCRIPTION OF THE PREFERRED EMBODIMENTS

Plural embodiments of the invention will be described below. First, relation between the summary of each embodiment and referred drawings will be described.

A first embodiment is an example referring to FIGS. 1 to 16 in the case where a storage adaptor to which an external device is allocated is selected and allocated based upon the usage of a cache having a dirty attribute and the external device is allocated to the storage adaptor when the device in an external storage which is a first storage is defined as a logical device of a cluster storage system which is a second storage system.

A second embodiment is an example referring to FIGS. 17 to 19 in the case where a storage adaptor to which an external device is allocated is changed, accepting input-output processing to/from the corresponding external device.

A third embodiment is an example referring to FIGS. 20 to 23 in the case where a storage adaptor to which an external device is allocated is selected and allocated based upon the usage of a cache having a side file attribute when the external device is defined as a logical device of a second storage system which is a cluster storage system on the premise that an asynchronous remote copy function described later is applied to the device in an external storage which is a first storage.

A fourth embodiment is an example referring to FIG. 24 in the case where a storage adaptor to which an external device is allocated is changed, accepting input-output processing to/from the external device by a host on the premise that an asynchronous remote copy function described later is applied to the device in an external storage which is a first storage.

Figure 25:
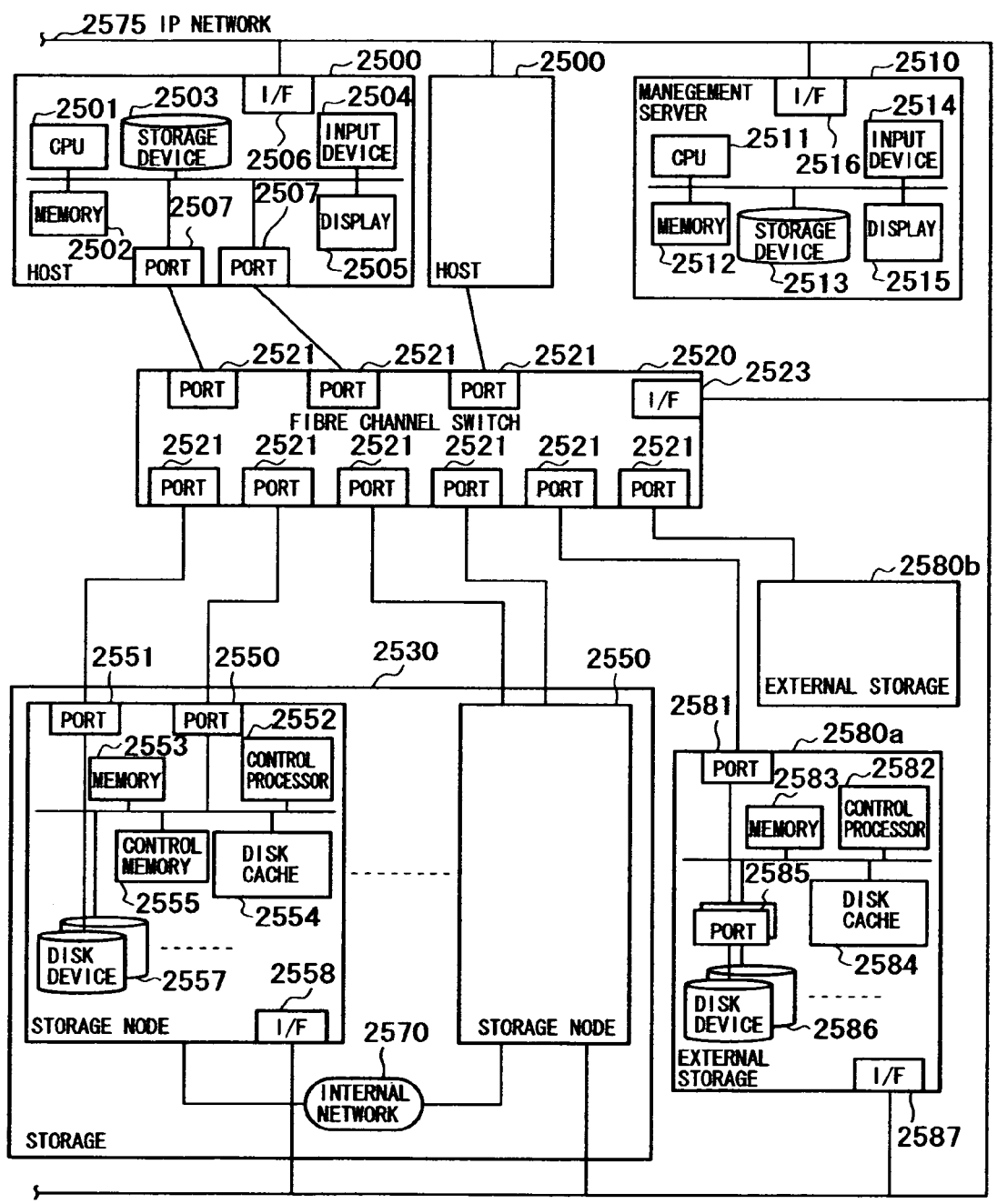
FIG. 25 shows the configuration of a computing system in a fifth embodiment.

A fifth embodiment is an example referring to FIG. 25 for selecting or switching a storage node itself. In the first to fourth embodiments, the storage node is divided into a protocol adaptor and the storage adaptor, and the storage adaptor is selected or switched, while in the fifth embodiment, the storage node is not divided into a protocol adaptor and a storage adaptor and the storage node itself is selected or switched in consideration of the dispersion of a load.

First Embodiment

First, referring to FIGS. 1 to 16, the first embodiment will be described.

Figure 1:
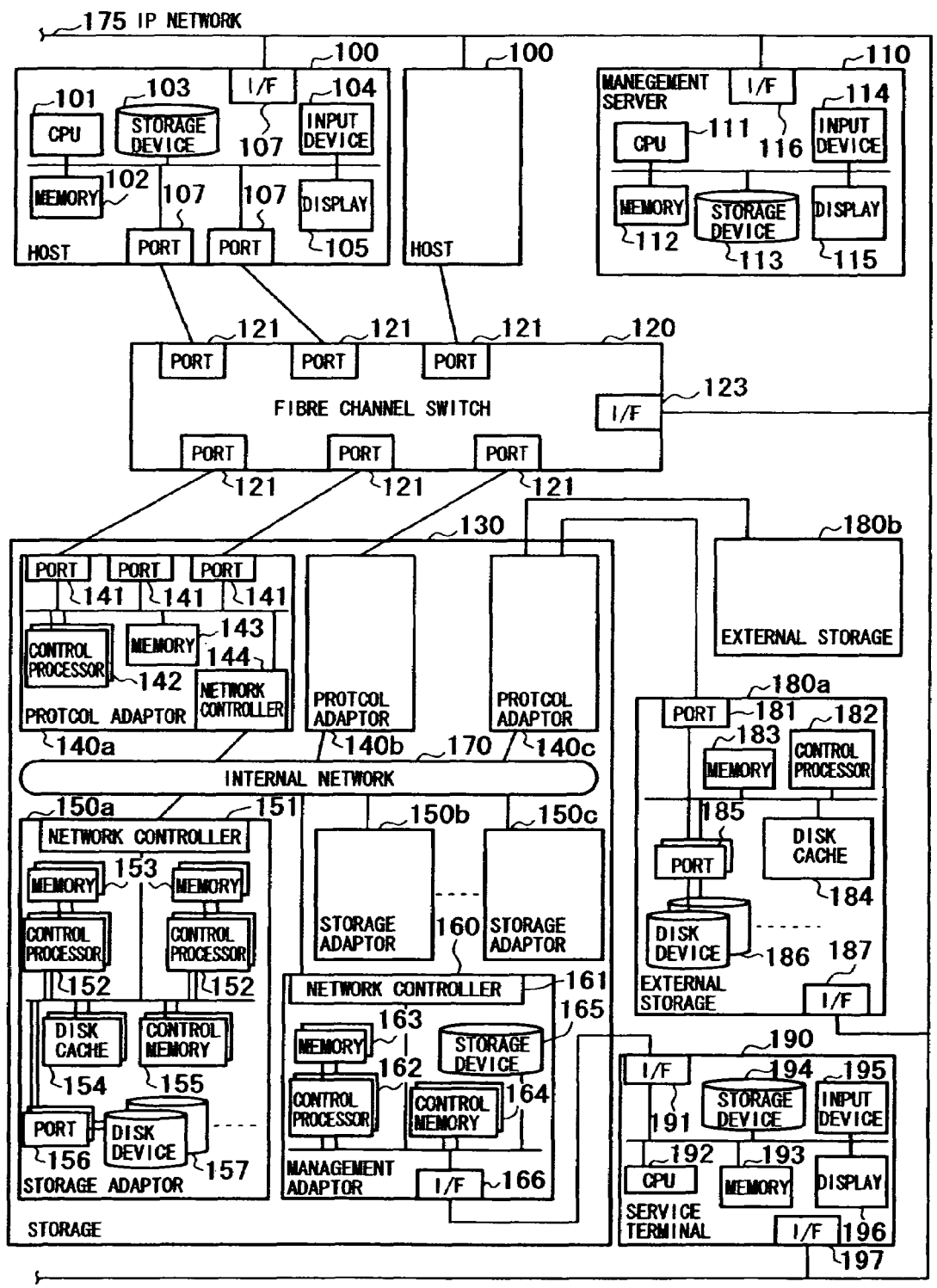
FIG. 1 shows the hardware configuration of a computing system equivalent to a first embodiment of the invention.

FIG. 1 shows the hardware configuration of a computing system in the first embodiment.

The computing system is composed of one or more host computers (merely called hosts) 100, a management server 110, a fibre channel switch 120, a storage system 130, one or more external storages 180a, 180b (generically called 180) and a service terminal 190.

The host 100 and the storage system 130 are connected to each port 121 of the fibre channel switch 120 via a port 107 and a port 141 and configure a storage area network (SAN).

Further, the external storages 180a and 180b are connected to the storage system 130 via each port 181 and are provided to the host 100 via the storage system 130 as devices of the storage system 130. All the components including the host 100 and the switch 120 are connected to the management server 110 via an IP network 175 and is jointly managed by SAN management software (not shown) operated in the management server 110. In this embodiment, the storage system 130 is connected to the management server 110 via the service terminal 190.

The host 100 is a computer provided with CPU 101, a memory 102 and others and achieves a predetermined function when software such as an operating system and an application program respectively stored in a storage 103 such as a disk device and a photomagnetic disk device is read into the memory 102 and CPU 101 reads and executes the programs from the memory 102. The host is provided with an input device 104 such as a keyboard and a mouse and a display 105, accepts operation from a host manager and others and can display designated information.

The management server 110 also achieves a predetermined function such as the operation/maintenance management of the whole computing system when SAN management software and others stored in the storage 103 are read into a memory 112 and CPU 111 reads and executes them. The management server also collects configuration information, a resource utilization factor, performance monitoring information and others from each component in the computing system via the IP network 175 from an interface 116, provides the information to a storage manager on a display 115 and transmits an instruction for operation and maintenance received from an input device 114 to each component. The processing is executed by the SAN management software not shown.

The fibre channel switch 120 is provided with plural ports 121. One of the port 107 of the host 100 and the port 141 of the storage system 130 is connected to each port 121. The fibre channel switch 120 is provided with an interface 123 and is also connected to the IP network 175 via the interface. The fibre channel switch 120 is used for enabling one or more hosts 100 to freely access to the storage system 130. In this configuration, all the hosts 100 can physically access to the storage system 130 connected to the fibre channel switch 120. The fibre channel switch 120 is also provided with a function for limiting communication from a specific port called zoning to a specific port and is used when access to the specific port 141 of the specific storage system 130 is limited to the specific host 100 for example. For a method of controlling the combination of a connecting port and a connected port, there are a method of using port ID allocated to the port 121 of the fibre channel switch 120 and a method of using a world wide name (WWN) held by the port 107 of each host 100 and the port 141 of the storage system 130.

The storage system 130 is configured by connecting plural protocol adaptors 140, plural storage adaptors 150 and a management adaptor 160 via an internal network 170.

The protocol adaptor 140 includes plural ports 141, one or more control processors 142 and a memory 143, specifies an accessing device that makes an I/O request received from the port 141 and transfers the I/O request and data to a suitable storage adaptor 150 from a network controller 144 via the internal network 170. At that time, the control processor 142 calculates an upper logical device number which the storage system 130 provides to the host 100 based upon port ID and a logical unit number (LUN) respectively included in the I/O request, further calculates the storage adaptor 150 to which the upper logical device corresponds and a lower logical device number and transfers the I/O request to the target storage adaptor 150. Besides, the protocol adaptor 140 is connected to another storage such as an external storage 180, transmits an I/O request from the storage adaptor 150 to the external storage 180 and can read/write from/to the external storage 180. In this embodiment, for the port 141, a fibre channel interface having a small computer system interface (SCSI) as a host protocol is supposed, however, another network interface for connecting a storage system such as an IP network interface having SCSI as a host protocol may also be used.

The storage adaptors 150a to 150c (generically called 150) are provided with one or more disk devices 157, one or more control processors 152, memories 153 corresponding to these control processors, disk caches 154, control memories 155 and a network controller 151. The control processor 152 processes an I/O request to the corresponding disk device 157 received from the network controller 151 via the internal network 170. The control processor 152 executes such processing and management particularly if the plural disk devices 157 of the storage system 130 seem to be not the individual disk devices 157 but one or plural logical devices such as a disk array to the host 100. The disk cache 154 stores frequently read data and temporarily stores write data from the host 100 so as to reduce access time from the host 100. The control memory 155 stores information for managing the disk device 157, a physical device formed by combining the plural disk devices 157 and a device (hereinafter called an external device) of the external storage 180 connected to the storage system 130 and managing correspondence between the external/physical device and a lower logical device.

It is desirable that the control memory nonvolatilizes data by backup by a battery and others and enhances availability such as dualizes for the enhancement of resistance to the failure of a medium because the loss of control information stored in the control memory 155 causes a situation where access to data stored in the disk device 157 is disabled. Similarly, in the case where an asynchronous destaging program using the disk cache 154 is run, it is desirable that the availability of the disk cache 154 is also enhanced by the dualization and the nonvolatilization of a record medium so as to prevent data held in the disk cache 154 and not written in the disk device 157 from being lost. The storage system 130 in this embodiment defines plural disk devices 157 as one or plural physical devices, allocates one lower/upper logical device to one physical device and provides it to the host 100. Needless to say, the individual disk device 157 may also seem, to the host 100, one physical device and one upper/lower logical device.

The management adaptor 160 is provided with a control processor 162, a memory 163, a control memory 164, a storage 165, a network controller 161 and an interface 166. Predetermined operation such as the configuration management of the storage system 130 is realized by reading a control program stored in the storage 165 such as a fixed disk device into the memory 163 and making the control program run in the control processor 162. The management adaptor provides configuration information to the storage manager from the service terminal 190 connected via the interface 166, receives an instruction from the manager for maintenance and operation and changes the configuration of the storage system 130 according to the received instruction. The configuration information of the storage system 130 is held in the control memory 164. The configuration information in the control memory 164 is shared among respective adaptors by being referred and updated by the control processor 142 of the protocol adaptor 140 and the control processor 152 of the storage adaptor 150. Since the whole storage system 130 cannot be accessed if the management adaptor 160 becomes inoperative because of failure, it is desirable that each device in the management adaptor 160 or the management adaptor 160 itself is dualized.

The internal network 170 is a crossbar switch for example, connects the protocol adaptor 140, the storage adaptor 150 and the management adaptor 160 and realizes the exchange of data, control information and configuration information among respective adaptors. Owing to the internal network 170, the management adaptor 160 can manage the configuration of all the devices, can distribute configuration information and access from an arbitrary port 141 of the protocol adaptor 140 to an arbitrary lower logical device of the storage adaptor 150 is enabled. To enhance availability, it is desirable that the internal network is also multiplexed.

The service terminal 190 is a personal computer (PC) for example, is provided with a function for operating a storage system management program and a function for input/output operation by the storage manager and functions as an interface related to the maintenance and the operation of the storage system 130 such as referring to configuration information, instructing the change of the configuration and instructing the operation of a specific function with the storage manager or the management server 110. Therefore, the service terminal is provided with a storage 194 for storing programs and data, a memory 193 for storing a program read from the storage 194 and various data, CPU 192 that executes the program, an input device 195 having an input function and a display 196.

In a transformed example, the service terminal 190 is omitted, the storage system 130 is directly connected to the management server 110 and may also be managed by management software operated in the management server 110.

The external storage 180 is provided with a function for processing an I/O request to a disk device 186 received from the port 181 like the storage system 130. That is, the external storage is provided with the mass disk device 186 connected to an internal interface via a port 185, a disk cache 184, a memory 183 and a control processor 182.

In this example, the scale of the external storage 180 is smaller than that of the storage system 130. However, the external storage may also have the same configuration and the same scale as those of the storage system 130.

Next, the software configuration of the storage system 130 will be described.

Figure 2A:
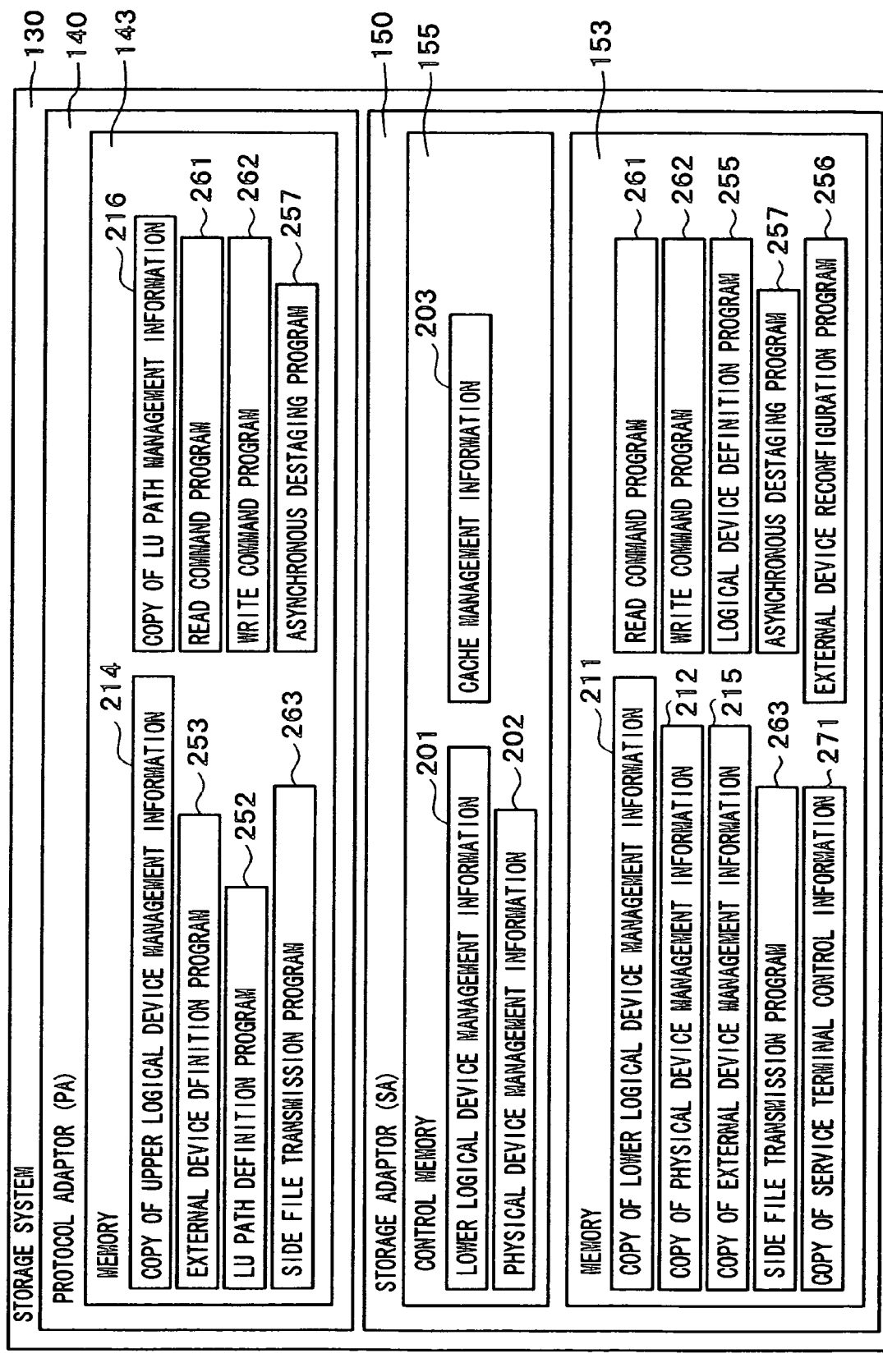
FIG. 2 shows the configuration of software in the first embodiment.
Figure 2B:
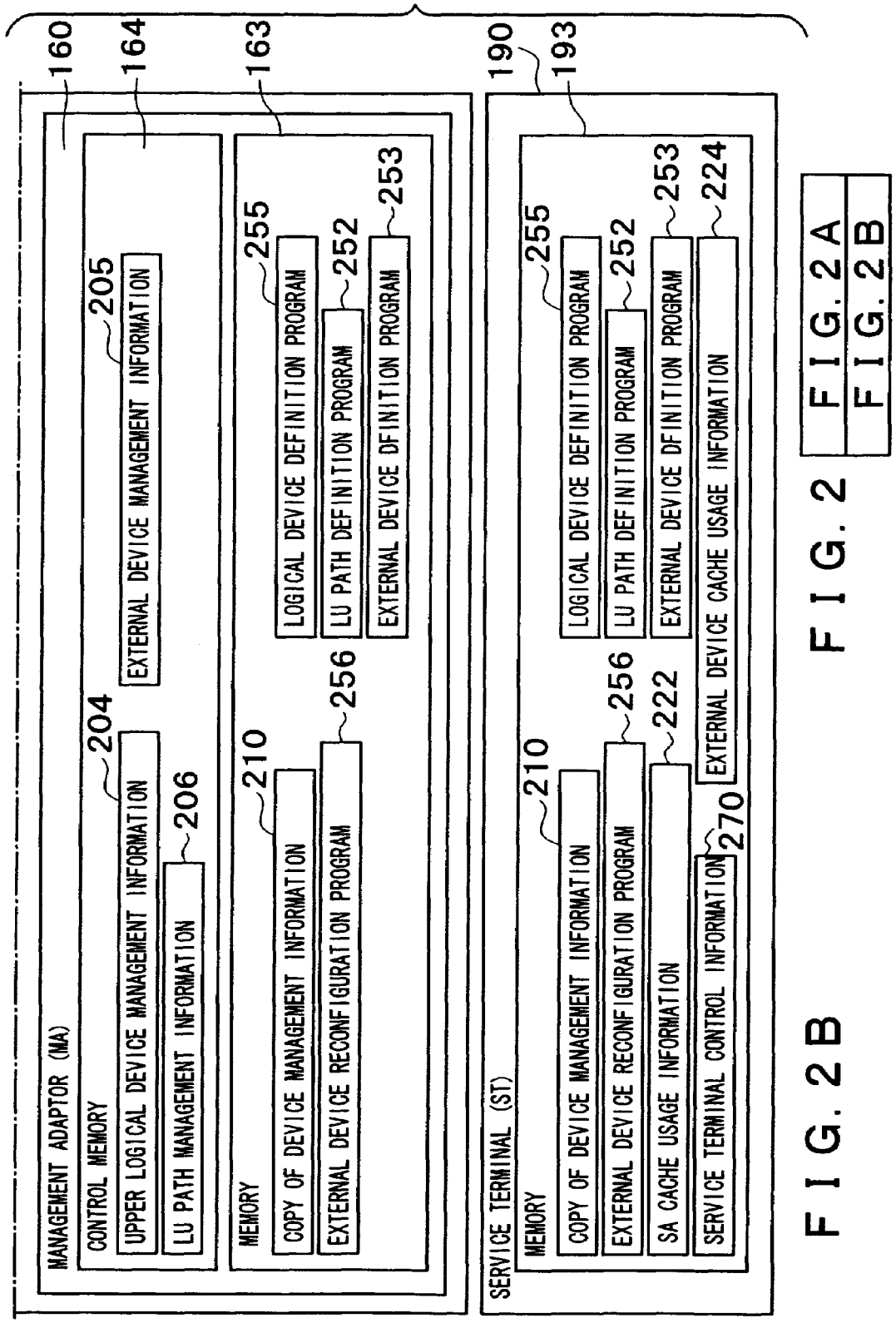

FIG. 2 is a block diagram of software showing control information and a storage system control processing program respectively stored in the control memory and the memories of the storage system 130 and the service terminal 190.

In the following description, for simplification, the protocol adaptor 140 is represented as PA, the storage adaptor 150 is represented as SA, the management adaptor 160 is represented as MA, and the service terminal 190 is represented as ST.

In this example, device hierarchy in the storage system 130 is as follows. In SA 150, a disk array is configured by the plural disk devices 157 and a physical device is configured. The external devices of the external storage 180 connected to PA 140 are managed by MA 160 after they are recognized by PA 140. In SA 150, a lower logical device is allocated to the physical device and the external storage. The lower logical device is a logical device in each SA 150 and the number is independently managed in each SA 150. The lower logical device corresponds to an upper logical device managed in MA 160 and is provided to the host 100 as a device of the storage system 130. For the cache usage information of the storage system 130, SA cache usage information 222 and external device cache usage information 224 are stored in the memory 193 of ST 190.

These various management information and various processing will be described later referring to FIGS. 3 to 16.

Figure 3:
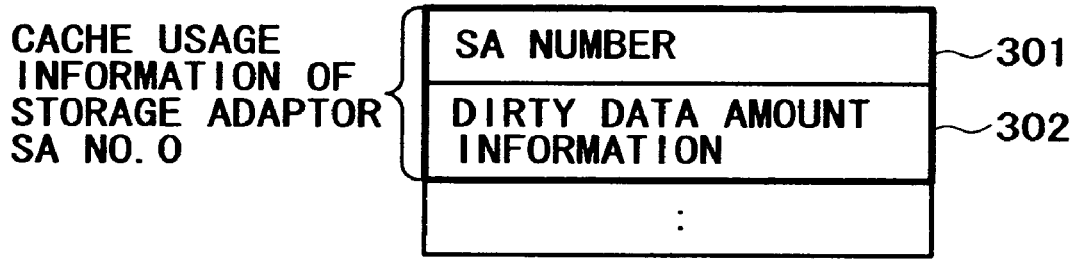
FIG. 3 shows the configuration of the cache usage information of a storage adaptor in the first embodiment.
Figure 4:
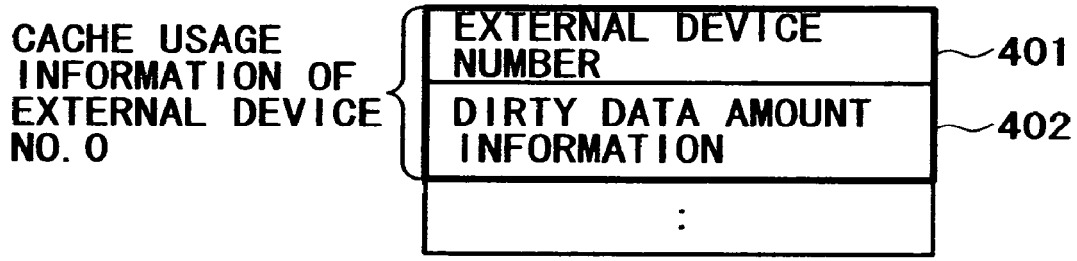
FIG. 4 shows the configuration of external device cache usage information in the first embodiment.

FIGS. 3 and 4 show the configuration of tables for managing cache usage in the storage system 130.

Before the description of these tables, first, a method of controlling the disk cache 154 will be described.

When write data received from the host 100 is stored in the disk cache 154, the storage adaptor 150 transmits a writing completion report to the host 100 and writes the data to the physical/external device at suitable timing after the report of the writing completion. This processing is called an asynchronous destaging program. The data stored in the disk cache 154 and not written to the physical/external device yet is called dirty data. The dirty data is required to continue to be held in the disk cache 154 until it is written to the physical/external device.

However, depending upon the writing speed of dirty data to the physical/external device and the frequency of writing requests from the host 100, dirty data remains in the disk cache 154 in large quantity and the disk cache 154 may be unable to be allocated to a new I/O request. To desirably avoid such a state and enhance the access performance of the whole storage system 130, it is effective to equalize the frequency of writing requests to the device in each SA 150. As the frequency of writing requests to the device in SA 150 is relative to the average in time of the amount of dirty data corresponding to the device, the average in time of the amount of dirty data is used as an index to equalize the frequency of writing requests to the device in each SA 150.

The disk cache 154 is managed by a unit called a segment and acquired by dividing the disk cache 154 into fixed quantity. The amount of dirty data is calculated by the number of segments having a dirty attribute. Though not shown, SA 150 is provided with a dirty segment counter that holds the number of segments having a dirty attribute and a dirty segment counter that corresponds to the external device managed in the storage adaptor 150 and holds the number of segments having a dirty attribute in the control memory 155.

In the connection of the external storage, when the host 100 connected to the storage system 130 accesses to the external device, the performance of access to the external device can be enhanced by making the external device use the disk cache 154 in SA 150 of the storage system 130.

FIG. 3 shows the configuration of the SA cache usage information 222.

In a field of the SA cache usage information 222, an SA number 301 and the corresponding dirty data amount information 302 are held to manage the amount of dirty data in a specific time zone of SA 150 in the storage system 130. The dirty data amount information 302 is acquired by referring to the dirty segment counter corresponding to each SA 150 at a fixed time interval in a time zone included in total time information 501 described later and calculating an average value of them in SA 150. The dirty data amount information 302 acquired as described above is transmitted to ST 190 together with the SA number 301 and is stored in the SA cache usage information 222 in ST 190.

FIG. 4 shows the configuration of the external device cache usage information 224.

The external device cache usage information 224 is information related to the amount of dirty data of the external device managed in the storage system 130 and in its field, an external device number 401 and the corresponding dirty data amount information 402 are held. That is, in the field of the external device cache usage information 224, the amount of dirty data stored in the cache in SA 150 is held as data stored in the external device in SA 150 in the storage system 130 that manages the external device designated by the external device number 401. A value of the dirty data amount information 402 is acquired by referring to the dirty segment counter corresponding to the external device at a fixed time interval in a time zone included in the total time information 501 described later and calculating an average value of them in SA 150. The dirty data amount information 402 acquired as described above is transmitted to ST 190 together with the external device number 401 and is stored in the external device cache usage information 224 in ST 190.

Figure 5:
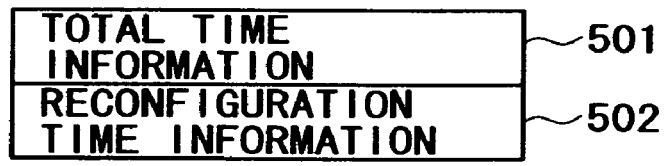
FIG. 5 shows the configuration of service terminal control information in the first embodiment.

FIG. 5 shows the configuration of service terminal control information 270.

The service terminal control information 270 is input from the input device 195 by the storage manager and is held in the memory 193 of ST 190. Besides, the copy 271 of the service terminal control information is held in the memory 153 of SA 150. The total time information 501 designates which time zone's average should be calculated when the cache usage information stored in each field of the SA cache usage information 222 and the external device cache usage information 224 is calculated. Reconfiguration time information 502 is information for designating when ST 190 should instruct the management adapter 160 to change the allocation of the external device.

For the management information of the storage system 130, lower logical device management information 201, physical device management information 202 and cache management information 203 are stored in the control memory 155 of SA 150, and upper logical device management information 204, external device management information 205 and LU path management information 206 are stored in the control memory 164 of MA 160.

FIG. 6 shows the configuration of the upper logical device management information 204.

A set of information from an upper logical device number 601 to a connected host name 606 is held per upper logical device.

In a field of size 602, the capacity of an upper logical device specified by the upper logical device number 601 is stored. In a field of the corresponding SA number/lower logical device number 603, a number of a lower logical device to which the upper logical device corresponds and an SA number to which the lower logical device belongs are stored. If the upper logical device is undefined, an invalid value is set in this entry. The lower logical device number is entered in the lower logical device management information 201 of specific SA 150.

In a field of a device state 604, information showing a state of the upper logical device is set. For the state, "online", "offline", "unmounted" and "failure offline" exist. "Online" shows that the upper logical device is normally operated and access from the host 100 is possible. "Offline" shows that the upper logical device is defined and is normally operated, but access from the host 100 is impossible because LU path is undefined. "Unmounted" shows that the upper logical device is not defined and access from the host 100 is impossible. "Failure offline" shows that failure occurs in the upper logical device and access from the host 100 is impossible.

In this embodiment, for simplification, an upper logical device shall be allocated to a lower logical device allocated to a physical device installed as the disk device 157 beforehand in the shipment of a product. Therefore, for an available upper logical device, an initial value of the device state 604 is "offline" and the others are "unmounted".

In a port number of an entry 605, information showing to which port out of plural ports 141 the upper logical device is connected is set. A unique number in the storage system 130 is allocated to each port 141 and a number of the port 141 where LUN of the upper logical device is defined is recorded. Target ID and LUN in the same entry are identifiers for identifying the upper logical device. For these identifiers, SCSI-ID and LUN used when the host 100 accesses to the device via SCSI are used.

The connected host name 606 is a host name for identifying the host 100 which is allowed to access to the device. The host name has only to be a value which can uniquely identify the host 100 or the port 107 such as a world wide name (WWN) given to the port 107 of the host 100. In the same storage system 130, in addition, management information related to an attribute such as WWN of each port 141 is held.

FIG. 7 shows the configuration of the LU path management information 206.

For each port 141 in the storage system 130, the information of effective LUNs is held. In a field of target ID/LUN 702, an address of LUN corresponding to a port number 701 is stored. In a field of the corresponding upper logical device number 703, a number of an upper logical device to which LUN is allocated is stored. A connected host name 704 is information showing the host 100 which is allowed to access to LUN of the port 141. When LUNs of plural ports 141 are defined for one upper logical device, a sum of sets of connected host names 704 of all LUNs is held in the connected host name 606 of the upper logical device management information 203.

FIG. 8 shows the configuration of lower logical device management information 201.

Per lower logical device in each SA 150, a set of information from a lower logical device number 801 to the corresponding upper logical device number 805 is held.

In a field of size 802, the capacity of a lower logical device specified by the lower logical device number 801 is stored. In a field of the corresponding physical/external device number 803, a physical device number in SA 150 or an external device number to which the lower logical device corresponds is stored. If no number is allocated to the physical/external device, an invalid value is set in this entry. This device number is entered in a field of the physical device management information 202 or the external device management information 205.

In a field of a device state 804, information showing a state of the lower logical device is set. As a value showing a state of the lower logical device is similar to the device state 604 of the upper logical device management information 203, the description is omitted. In a field of the corresponding upper logical device number 805, an upper logical device number to which the lower logical device corresponds is set.

FIG. 9 shows the configuration of the physical device management information 202 that manages a physical device equivalent to the disk device 157 in SA 150.

Per physical device in each SA 150, a set of information from a physical device number 901 to size 909 in the disk device is held. In a field of size 902, the capacity of the physical device specified by the physical device number 901 is stored. In a field of the corresponding lower logical device number 903, a lower logical device number in SA 150 to which the physical device corresponds is stored. If no number is allocated to the lower logical device, an invalid value is set in the corresponding entry.

In a field of a device state 904, information showing a state of the physical device is set. For the state, "online", "offline", "unmounted" and "failure offline" exist. "Online" shows that the physical device is normally operated and is allocated to the lower logical device. "Offline" shows that the physical device is defined and is normally operated, but the physical device is unallocated to the lower logical device. "Unmounted" shows that no physical device is defined for the disk device 157. "Failure offline" shows that failure occurs in the physical device and the physical device cannot be allocated to the lower logical device. In this embodiment, for simplification, a physical device shall be installed as the disk device 157 beforehand in the shipment from a factory of a product. Therefore, for an available physical device, an initial value of the device state 64 is "offline" and the others are "unmounted".

In a field of a RAID configuration 905, information related to the RAID configuration such as a RAID level and the number of data disks and parity disks of the disk device 157 to which the physical device is allocated is held. Similarly, in a field of stripe size 906, data division unit (stripe) length in RAID is held. In a field of a disk number list 907, numbers of plural disk devices 157 forming RAID to which the physical device is allocated are held. These numbers are unique values given for identifying the disk device 157 in SA 150. In fields of a start offset in the disk device 908 and the size 909 in the disk device, information showing to which area in each disk device 157 physical device data is allocated is set. In this embodiment, for simplification, the offset and the size of all physical devices in each disk device 157 forming RAID are unified.

FIG. 10 shows the configuration of the external device management information 205.

In a field of the management information 205, a set from an external device number 1001 to target port ID/target ID/an LUN list 1008 is held per external device in the whole storage system 130 to manage a device in the external storage 180 connected to the storage system 130 and corresponding to a lower logical device of the storage system 130.

In a field of the external device number 1001, a unique value in the storage system 130 allocated in the storage system 130 is held. In a field of size 1002, the capacity of the external device specified by the external device number 1001 is stored. In a field of the corresponding SA number/lower logical device number 1003, an SA number and a lower logical device number in the storage system 130 to which the external device corresponds are stored. If no external device is allocated to the lower logical device, an invalid value is set in this entry.

In a field of a device state 1004, information showing a state of the corresponding external device is set. However, the meaning of each state is the same as that of the device state 904 in the physical device management information 202. As the storage system 130 is initially connected to no external storage, an initial value of the device state 1004 is unmounted.

In a field of storage identification information 1005, the identification information of the external storage 180 in which the external device is mounted is held. For the storage identification information, the combination of the vendor identification information of the external storage and a serial number which each vender uniquely allocates is considered. In a field of a device number 1006 in the external storage, a device number in the external storage 180 to which the external device corresponds is held. As the external device is a logical device of the external storage 180, a logical device number of the external storage 180 is held in this entry.

In a field of a PA number/an initiator port number list 1007, the port 141 of the storage system 130 which can access to the external device and a list of numbers of PA 140 to which the port belongs are held. In a field of target port ID/target ID/an LUN list 1008, if LUN of the external device is defined for one or more ports 181 of the external storage 180, port IDs of the ports 181/target ID to which the external device is allocated/LUN is held by one or plural pieces.

Next, referring to FIG. 2 again, information and a program stored in the memory of each component will be described.

Each control information pieces stored in the control memories 155, 164 can be referred and updated by the control processor of each component. At that time, however, access via the internal network 170 is required. Therefore, to enhance throughput, the copy of control information required for processing executed by each control processor is held in the memory of each component. When control information is updated because of reconfiguration, it is notified another component via the internal network 170 and current information is incorporated from the control memory into each component.

For another method, for example, a method of providing a flag showing whether updating is performed or not to the control memory per configuration information piece held in the control memory, referring to the flag when the control processor of each component starts processing or every time the control processor refers each configuration information piece and checking whether updating is performed or not is conceivable. In addition to the copy of control information, a control program operated in each control processor is stored in the memory of each component.

In this embodiment, a control method will be described below using a process for allocating a device including the external device to a specific server and making it available in the storage system 130, a process for an I/O request to the device of the storage system 130 including the external device and a process for changing the allocation of the allocated external device as an example.

The process for allocating the device including the external device to the specific server and making it available can be roughly divided into three processes for defining the external device, defining the logical device and defining the LU path.

FIG. 11 is a flowchart showing an external device definition program 253.

The external device definition program 253 is a process in the case where the device of the external storage 180 is introduced as an external device under the control of the storage system 130.

First, ST 190 that accepts an instruction to connect to the external storage 180 from the service terminal 190 or the management server 110 transmits the instruction to MA 160 (1101). Information for specifying the target external storage 180, for example, WWN of the port 181 of the external storage 180, device identification information acquired by transmitting Inquiry command to the external storage device or both information and a number of the port 141 connected to the external storage 180 are added to the instruction for connection. MA 160 receives the instruction to connect the external storage 180 and transmits the instruction to connect the external storage to all PAs 140 corresponding to numbers of designated all ports 141 (1102).

PA 140 retrieves the external device to be connected using the identification information of the external storage 180 added to the instruction for connection (1103). Concretely, when WWN of the port 181 is acquired as external storage identification information, PA 140 transmits Inquiry command to all LUNs of the port 181 of the external storage 180 from the designated port 141 and makes LUN that normally responds a candidate for registering as an external device. When only device identification information is acquired as identification information, Inquiry command is transmitted to all node ports (already detected in node port log-in) detected from all ports 141 of PA 140 for all LUNs and the device identification information in returned information of a device that normally responds is compared with a value added to the instruction for connection. PA 140 returns an information list of detected external device registration candidates to MA 160 (1104). Information at this time includes information required to set the external device management information 205.

MA 160 registers the device information of external devices included in a received external device list in the external device management information 205 and notifies each component that the information is updated (1105). For the registration of information with the external device management information 205, concretely, the size 1002, the storage identification information 1005 and the device number in the external storage 1006 are set in the entries of the allocated external device number based upon Inquiry information, and the entries 1007, 1008 are set based upon information from PA 140. As the device number in the entry 1003 is unallocated, an invalid value which is an initial value is set. "Offline" is set in the device state 1004.

Each SA 150 and PA 140 that receive the notification of updating incorporate the external device management information 205 of the control memory 164 of MA 160 in each memory. ST 190 reports the completion of the external device definition program to the service terminal 190 or the management server 110 which is a requester in addition to the incorporation of the above mentioned information in the memory (1106).

In this embodiment, the service terminal 190 or the management server 110 instructs the storage system 130 to connect and designates the target external storage 180. However, the service terminal or the management server only instructs the storage system 130 to connect to the external storage 180 and the storage system 130 may also register all the devices of all the storages detected from all ports 141 as an external device. The service terminal or the management server does not particularly definitely instruct the storage system to connect and the storage system 130 may also register detectable all devices as an external device when the external storage 180 is connected to the storage system 130.

Figure 12:
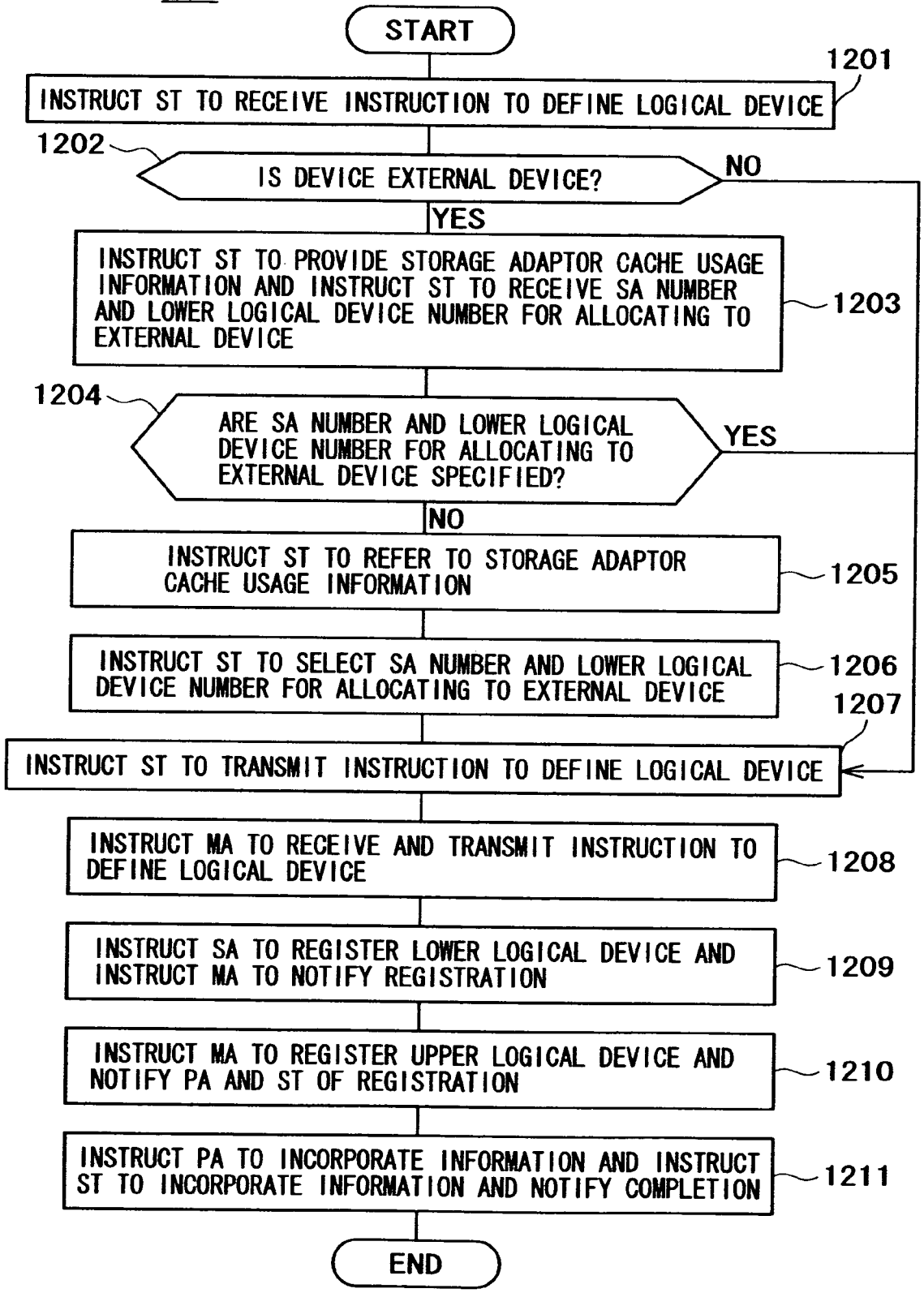
FIG. 12 is a flowchart showing a logical device definition program in the first embodiment.

FIG. 12 is a flowchart showing a logical device definition program 255.

The logical device definition program 255 is a process for receiving an instruction from the service terminal 190 or the management server 110 and defining a lower logical device of the physical device mounted in the storage system 130 or the external device defined in the external device definition program 253.

First, ST 190 accepts an instruction to define a logical device (1201). A physical/external device number of which a logical device is to be defined and a number of a defined upper logical device are added to this instruction. In case the device the logical device of which is to be defined is not an external device, an SA number and a lower logical device number are further added.

In this embodiment, for the simplification of description, one logical device is allocated to one physical/external device. However, one logical device may also be defined for a device group composed of two or more physical/external devices, two or more logical devices may be also defined for one physical/external device, and two or more logical devices may also be defined for a device group composed of two or more physical/external devices. However, in respective cases, additional information such as the start position and the size of the corresponding logical device in a/an physical/external device is required in the lower logical device management information 201. If a device a logical device of which is to be defined is a physical device, ST 190 transmits an instruction to define a logical device to MA 160 (1207).

If a device a logical device of which is to be defined is an external device (1202), ST 190 provides the SA cache usage information 222 to the storage manager and accepts an SA number and a lower logical device number respectively allocated to the external device if necessary (1203). If the SA number and the lower logical device number respectively allocated to the external device are specified in the step 1203 (1204), ST 190 transmits an instruction to define a logical device to MA 160 (1207).

If the SA number and the lower logical device number respectively allocated to the external device are not specified in the step 1204, ST 190 refers to the SA cache usage information 222 to select SA 150 allocated to the external device (1205). ST 190 selects SA 150 having the least amount of dirty data in the SA cache usage information 222 (1206). Besides, ST 190 selects an unused lower logical device number in SA 150. Afterward, ST 190 transmits an instruction to define a logical device to MA 160 (1207).

MA 160, which receives the instruction to define a logical device, specifies target SA 150 based upon definition instruction information and transmits an instruction to define to SA 150 (1208). The target SA 150 registers a lower logical device for a designated physical/external device (1209). Concretely, in target device entries of the lower logical device management information 201, the size and the device number of the physical/external device are set in entries 802, 803, an upper logical device number is set in a field of the corresponding upper logical device number 805, and "online" is set in a field of a device state 804. Besides, the corresponding SA number/lower logical device number of the physical/external device is set and the device state is updated to "online". When registration is completed, SA 150 notifies MA 160 of the completion.

Next, MA 160 defines the target upper logical device in the lower logical device and notifies each component of the updating of information (1210). Concretely, in the device entries of the upper logical device management information 203, size 602 and the corresponding SA number/lower logical device number 603 are set, a device state is set to "offline" and in entries 605, 606, an invalid value is set because a port number, target ID, LUN and a connected host name are unallocated. PA 140 which is notified of the updating of information incorporates updated management information into the memory 143 and ST 190 reports the completion of a logical device definition program to a requester after the incorporation of information (1211).

FIG. 13 is a flowchart showing an LU path definition program 252.

ST 190 that receives an instruction to define an LU path transfers the instruction to MA 160 (1301). The identification information (WWN of the port 107 and others) of the host 100 that accesses LU is added to the instruction in addition to a target upper logical device number, a number of the port 141 and LUN for defining LU. MA 160, which receives the instruction to define the LU path, registers the LU path for the upper logical device (1302). Concretely, corresponding information is set in fields of the port number/target ID/LUN 605 and the connected host name 606 of the upper logical device management information 204 and configuration information including target ID/LUN 701 is set in an empty entry corresponding to the port 141 of the LU path management information 206. When registration is completed, it is notified to each component, PA 140 incorporates the information, SA 150 incorporates the information and reports completion to a requester.

By the above mentioned three programs, an external device is registered as a device of the storage system 130, is allocated to any SA 150 in consideration of the equalization of the cache usage of SA 150 in the storage system 130 and access from the host 100 is enabled.

Next, a method of processing an I/O request from the host 100 in a state in which an external device is allocated as described above will be described with the method classified in three of a read command program, a write command program and an asynchronous destaging program in PA 140 and SA 150.

FIG. 14 is a flowchart showing the read command program 261.

FIG. 14 explains processing in the case where the host 100 reads data from a device including an external device in the storage system 130.

PA 140 receives a read command which the host 100 issues at the specific port 141 (1401). PA 140 analyzes the received command, deduces an upper logical device number corresponding to requested data, calculates the corresponding SA number/lower logical device number based upon upper logical device management information (1402) and transfers a request for reading to SA 150 corresponding to the SA number (1403). SA 150 receives the request for reading from a network controller 151 and determines whether the requested data is stored in the disk cache 154 or not by referring to the cache management information 203.

If the requested data is stored in the disk cache 154 -(a cache hit), SA 150 transmits the corresponding data to PA 140 which is an issuer of the request (1410). PA 140, which receives data from SA 150, transmits the data to the host 100 via the port 141 (1411, 1412).

In the meantime, if the requested data is not stored in the disk cache 154 (a cache miss), SA 150 updates the cache management information 203 and secures an area for storing the requested data in the disk cache 154. If the request is not made to an external device, the requested data is read from a physical device and is stored in the corresponding area of the disk cache 154. The succeeding operational flow is similar to that in the case of the cache hit (1411, 1412). If the request is made to an external device, SA 150 reads data from the external storage 180 via PA 140 (1413 to 1416) and stores the data in the corresponding area of the disk cache 154 (1409). The succeeding operational flow is similar to that in the case of the cache hit (1410 to 1412). As described above, data is read from a device including an external device in response to the request for reading from the host 100 and is transmitted to the host 100.

FIG. 15 is a flowchart showing the write command program 262.

FIG. 15 explains processing in case the host 100 stores data in the disk cache 154 in the storage system 130.

First, PA 140 receives a write command issued by the host 100 at the specific port 141 (1501). PA 140 analyzes the received command, deduces an upper logical device number corresponding to requested data, calculates corresponding SA number/lower logical device number based upon the upper logical device management information (1502) and transfers a request for writing to SA 150 corresponding to the SA number (1503). SA 150 receives the request for writing from the network controller 151 and determines whether requested data is stored in the disk cache 154 or not by referring to the cache management information 203 (1504).

If the requested data is stored in the disk cache 154 (a cache hit), SA 150 notifies PA 140 which is a requester that writing is ready (1507). PA 140, which receives notification from SA 150 that writing is ready, notifies the host 100 that writing is ready via the port 141 (1508, 1509). Afterward, PA 140 receives data from the host 100 via the port 121 and transmits the data to the corresponding SA 150 (1510, 1511). SA 150, which receives the data from PA 140, stores the data in the corresponding area of the disk cache 154 and transmits the report of completion to PA 140 (1512, 1513, 1514). PA 140, which receives the report of completion from SA 150, transmits the report of completion to the host 100 (1515, 1516).

In the meantime, if the requested data is not stored in the disk cache 154 (a cache miss), SA 150 updates the cache management information 203 and secures an area for storing the requested data in the disk cache 154 (1506). The succeeding operational flow is similar to that in the case of the cache hit (1507 to 1516).

As described above, in response to the request for writing from the host 100, write data from the host 100 is stored in the disk cache 154.

FIG. 16 is a flowchart showing the asynchronous destaging program 257.

This processing is processing for writing write data stored in the disk cache 154 to the disk device 157 or the external storage 180 as a result of the write command program 262 in SA 150.

Write data held in the disk cache 154 is managed according to the cache management information 203. Normally, write data and data read from the disk device are managed in a queue so that desirably older data is pushed out of the disk cache 154. According to such a conventional type method, data which is a target of the asynchronous destaging program is determined out of the managed data (1601). If target data is write data to a physical device, an area for the target data in the disk cache 154 is released after the data is written to the corresponding area of the disk device 157 (1603, 1604). If target data is write data to an external device, SA 150 writes data to the external storage 180 via PA 140 (1605 to 1610) and an area for the target data in the disk cache 154 is released (1604).

Second Embodiment

Next, referring to FIGS. 17 to 19, a second embodiment will be described.

In this embodiment, SA 150 allocated to an external device when a logical device is defined is changed to another SA 150 according to the variation in each SA 150 of the usage of a cache having an dirty attribute, accepting an I/O request to the device from a host 100. In the second embodiment, since the substantially similar hardware and software configuration to that in the first embodiment is supposed, the difference between the first and second embodiments will be described below.

FIG. 17 shows the configuration of upper logical device management information 204 in the second embodiment.

Compared with the first embodiment shown in FIG. 6, in an example shown in FIG. 17, a device access mode 607, a switching progress pointer 608 and a number of reconfigured SA/lower logical device 609 are added.

In a field of the device access mode 607, a "normal" value or a value "during reconfiguration" showing a mode of the processing of an I/O request to an upper logical device is set. The "normal" value is set for the upper logical device which is allocated to a lower logical device of specific SA 150 and in which a normal I/O process is executed, and "during reconfiguration" is set for the upper logical device which is actually an upper logical device of an external device and while the allocation of the external device is changed from the lower logical device of specific SA to a lower logical device of another SA 150.

The switching progress pointer 608 is used when the upper logical device is "during reconfiguration" and is information showing the leading address of a part in which a process for changing the allocation of the external device is uncompleted of the upper logical device. The switching progress pointer 608 is updated according to the progress of a cache missing process described later of SA 150. A number of reconfigured SA/lower logical device 609 is used when the upper logical device is "during reconfiguration" and in its field, an SA number and a lower logical device number of the destination of the reconfigured allocation of the external device are held.

FIG. 18 shows the configuration of lower logical device management information 201 in the second embodiment.

1. Compared with the first embodiment shown in FIG. 8, in an example shown in FIG. 18, the switching progress pointer 806 is added. The contents of other entries are the same as the lower logical device management information. The switching progress pointer 608 of the upper logical device management information 204 and the switching progress pointer 806 of the lower logical device management information 201 are updated according to the progress of the cache missing process executed by SA 150. Since the switching progress pointers 608 and 806 are managed by the upper logical device management information 204 and the lower logical device management information 201, the frequency of updating in the upper logical device management information 204 stored in MA 160 can be reduced.

As the incorporation of updated information into memories 143 of all PAs 140 is required when the upper logical device management information 204 is updated, the inhibition of the frequency of updating is effective in consideration of performance. However, in that case, since the last switching progress pointer 608 is referred in a read command program 261 and a write command program 262 in PA 140, the I/O request is also transferred from PA 140 to SA 150 for an area in which cache missing is already finished.

Therefore, a request for writing to the area in which the cache missing process is finished is not processed by asynchronous destaging according to a command program 254 in SA 150 and logic for promptly releasing a disk cache 154 utilized in a process for immediately writing to a physical/external device after the process is required.

FIG. 19 is a flowchart showing an external device reconfiguration program.

This program is processing for receiving an external device reconfiguration instruction from a service terminal 190 or a management server 110 and changing SA 150 allocated to the external device, that is, SA 150 for processing an I/O request of the external device.

ST 190 refers to the SA cache usage information 222 and the external device cache usage information 224, acquires the dirty data amount information 302 of all SAs 150 and the dirty data amount information 402 of all external devices, provides them to the service terminal 190 or the management server 110 and accepts an external device reconfiguration instruction (1901, 1902). The service terminal 190 or the management server 110 can specify an external device which is an object of reconfiguration and reconfigured SA 150 so that the cache usage of each SA 150 is equalized. In this case, they may be also not specified.

In case the external device which is the object of reconfiguration and the reconfigured SA 150 are specified (1903), estimated SA cache usage information after reconfiguration is provided to the service terminal 190 or the management server 110 to show the effect of the equalization of cache usage by the reconfiguration of an external device (1906). The estimated SA cache usage information is calculated by subtracting the current amount of dirty data of an external device which is an object of reconfiguration from the amount of dirty data of SA 150 before reconfiguration and adding it to the amount of dirty data of reconfigured SA 150. Afterward, ST 190 issues a reconfiguration instruction to MA 160 in a time zone specified in the reconfiguration time information 502 (1907). In this instruction, the information of a number of the external device which is the object of reconfiguration and a number of the reconfigured SA is included. MA 160 which accepts the reconfiguration instruction changes the access mode of the external device from "normal" to "during reconfiguration" (1908). MA 160 issues a reconfiguration instruction to reconfigured SA 160 (1909). The reconfigured SA 150 which receives the reconfiguration instruction registers a lower logical device for the designated external device and transmits the report of completion to MA 160 (1910).

MA 160 which receives the report of completion from the reconfigured SA 150 transmits a reconfiguration instruction to SA 150 before reconfiguration (1911). The SA 150 before reconfiguration which receives the reconfiguration instruction retrieves the disk cache 154 concerning all data of the corresponding lower logical device and releases a cache area allocated to already updated data after data which is not updated yet in a/an physical/external device is written to the corresponding device. The retrieval is sequentially performed from the leading address of the lower logical device using the cache management information 203 and concerning a part in which retrieval and a missing process are finished, progress is managed by advancing the switching progress pointer of upper/lower logical device management information. When the missing process is completed in all areas, it is reported to MA 160, MA 160 changes the device access mode 607 to "normal" and completes the external device reconfiguration program (1912, 1913).

In case the external device which is the object of reconfiguration and reconfigured SA 150 are not specified (1903), ST 190 selects an external device which is an object of reconfiguration and reconfigured SA 150 are selected so that the cache usage of each SA 150 is equalized (1904). For SA 150 which is a destination of reconfiguration, SA 150 having the least amount of dirty data is selected.

For an index of the equalization of cache usage, the standard deviation of the cache usage of each SA 150 can be used. Each external device allocated to a storage system 130 is selected as a reconfiguration object candidate using external device management information. As the amount of dirty data of the selected external device and the amount of dirty data of each SA 150 are known, the estimated amount of dirty data of each SA 150 in case SA 150 to which an external device is allocated is changed can be calculated and estimated standard deviation can be acquired using the estimated amount of dirty data of each SA 150. The external device selected as an object of reconfiguration shall be an external device having the least estimated standard deviation. However, in case the amount of dirty data is not equalized, that is, in case estimated standard deviation is equal to or more than the current standard deviation, the reconfiguration of the external device is not performed (1905). The succeeding processing is similar to that in case an external device which is an object of reconfiguration and reconfigured SA 150 are specified.

In the second embodiment, a part of the read command program 261 and the write command program 262 is different from respective parts in the first embodiment.

That is, in 1402 of the read command program 261 shown in FIG. 14, PA 140 analyzes a received command and checks a device access mode after PA deduces an upper logical device number corresponding to requested data. In case the device access mode is "normal", PA calculates the corresponding SA number and lower logical device number from upper logical device management information. Afterward, a request for reading is transferred to SA 150 corresponding to the SA number (1403).

In case the device access mode is "during reconfiguration", the switching progress pointer is referred and it is determined whether a requested access area is located before or after the switching progress pointer. Concerning an area before the switching progress pointer, that is, an area in which switching to reconfigured SA 150 is finished, the reconfigured SA 150 is determined as SA 150 as a destination of the request. If not, that is, concerning an area in which switching to reconfigured SA 150 is not completed, SA 150 before reconfiguration is determined as SA 150 as the destination of the request. In the step 1502 shown in FIG. 15, the similar determination is made and SA 150 as the destination of the request is determined.

Third Embodiment

Next, referring to FIGS. 20 to 23, a third embodiment will be described.

In this embodiment, it is premised that a storage system 130 applies an asynchronous remote copy function to a device (an external device) of an external storage 180*a* which is a first storage and data stored in the device of the external storage 180*a* is copied in a device of another external storage 180*b* by the asynchronous remote copy function with which the storage system 130 is provided. At this time, in this embodiment, a storage adaptor in the storage system 130 that manages the device of the external storage 180*a* as its own logical device and executes a remote copy process based upon the contents of the device of the external storage 180*a* is selected based upon the usage of a cache memory having a side file attribute.

Before the description of the third embodiment, first, the remote copy function will be described.

A remote copy is a function for making a backup of in a device (an original device) of a storage system in an original site in a device (a deputy device) of a storage system in a deputy site at real time. The loss of data by terrorism, disaster and others can be minimized by holding a copy of the original device to the deputy device in a remote location. The remote copy includes two types of a formation copy and an updating copy. The formation copy is operation for synchronizing a device pair of the original device and the deputy device separately from a read/write command from a host 100. Writing to the original device by the formation copy after the device pair is synchronized is also applied to the deputy device by the updating copy and a synchronous state is maintained. The remote copy is roughly classified into a synchronous remote copy and an asynchronous remote copy depending upon a method of the updating copy.

In the asynchronous remote copy, the report of completion is transmitted to the host 100 particularly when write data is received from the host 100 and is written to the cache memory. Out of write data which are objects of the asynchronous remote copy, data held in the cache memory of the original storage system and not transmitted to the deputy storage system yet is called side file data. A side file is required to be held in the cache memory until it is transmitted to the deputy storage system. However, depending upon the transmission speed of the side file to the deputy storage system and the frequency of requests to write from the host 100, side files stay in the cache memory in large quantity and the cache memory may be unable to be allocated to a new request to read/write.

The side file is managed as a segment having the side file attribute based upon cache management information 203 in a control memory 155 of SA 150 of the original storage system. The amount of side file data is calculated based upon the number of segments having the side file attribute. For the cache management information 203, control information such as time stamp information showing time at which write data is written to a disk cache 154, an upper logical device number corresponding to the write data, the positional information in an upper logical device of the write data and the size of the write data is stored. The time stamp information is transmitted as additional information when the side file is transmitted to the deputy storage system together with the write data. When writing to a device group composed of plural original devices mutually having dependence is applied to the deputy device, the order of writing is required to be guaranteed to maintain the consistency of data in the device group. In the deputy storage system, updating for plural deputy devices is performed, maintaining the order of writing based upon the time stamp information.

In the third embodiment, the asynchronous remote copy is made between the upper logical device in the storage system 130 corresponding to the external device in the first external storage 180*a* and a logical device in the second external storage 180*b* located in a remote location for example. That is, when a request for writing from the host 100 to the upper logical device in the storage system 130 is made, the storage adaptor that manages the upper logical device in the storage system 130 sends back the report of completion to the host 100 after writing write data to the cache memory, afterward transfers the write data to the second external storage 180*b* and also writes the write data to the external device in the first external storage 180*a* corresponding to the upper logical device.

In this embodiment, it is supposed that a storage at a destination of a remote copy is the second external storage 180*b*, however, a storage at a destination of a remote copy is not limited to the external storage 180. That is, a storage at a destination of a remote copy may be also an external storage provided with an external device managed as the upper logical device of the storage system 130 by the storage adaptor of the storage system 130, however, if a storage has only to be connected with the storage system 130 via a network, the storage is not limited to an external storage and may be also a storage provided with a device that can be accessed from the host 100 without passing the storage system 130.

In the third embodiment, as the substantially similar hardware configuration and software configuration to those in the first embodiment are also premised, difference between the third embodiment and the first embodiment will be described below.

Figure 20:
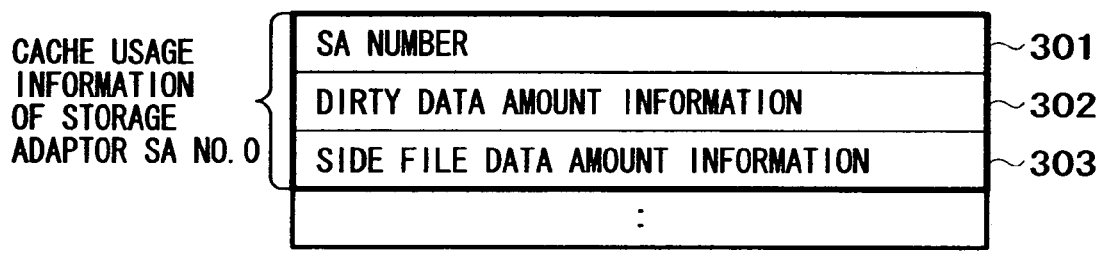
FIG. 20 shows the configuration of a storage adaptor cache usage information in a third embodiment.

FIG. 20 shows SA cache usage information 222.

FIG. 20 is different from FIG. 3 in that side file data amount information 303 for managing the information of the amount of side file data of SA 150 in the storage system 130 is added. A value of side file data amount information is calculated in SA 150 by referring to a side file segment counter corresponding to SA 150 at a fixed time interval in a time zone included in total time information 501 and calculating an average value of them.

Figure 21:
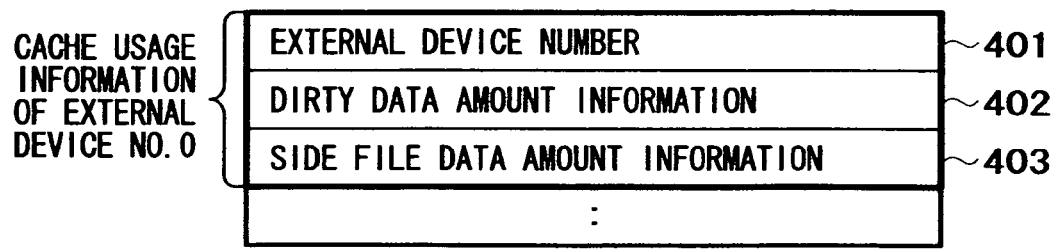
FIG. 21 shows the configuration of external device cache usage information in the third embodiment.

FIG. 21 shows external device cache usage information 224.

In FIG. 21, differently from FIG. 4, side file data amount information 403 for managing the amount of side file data in the storage system 130 in a specific time zone of an external device is added. A value of the side file data amount information 403 is calculated in SA 150 by referring to the side file segment counter corresponding to the external device at a fixed time interval in a time zone included in the total time information 501 and calculating an average value of them.

In the third embodiment, a logical device definition program 255 is partially changed.

In the first embodiment, in the step 1206 shown in FIG. 12, SA 150 having the least amount of dirty data is selected as an object of allocation, however, in the third embodiment, SA 150 having the least amount of side file data is selected as an object of allocation. By this process, an external device can be allocated to any SA 150 in consideration of the equalization of the cache usage of SA 150 in the storage system 130.

An external device definition program 253 and an LU path definition program 252 are similar to those in the first embodiment and access from the host 100 is enabled by the three programs composed of them and the logical device definition program 255.

Next, a read command program/a write command program in case an asynchronous remote copy is applied between the original device as the upper logical device which is actually the external device in the first external storage 180a and the deputy device which is a logical device in the second external storage 180b will be described. As the read command program 261 is similar to that in the first embodiment, the description is omitted.

Figure 22:
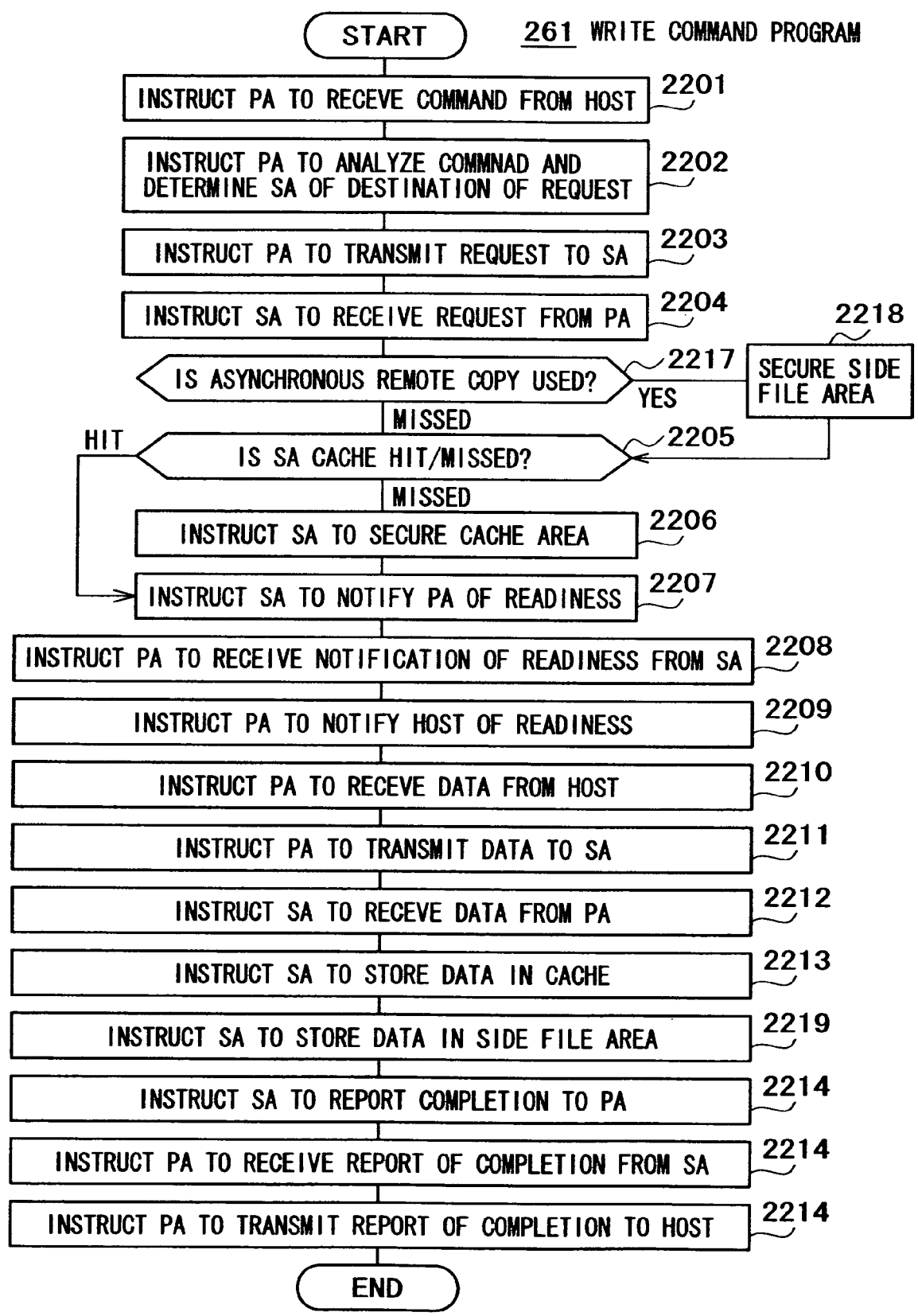
FIG. 22 is a flowchart showing a write command program in the third embodiment.

Next, referring to FIG. 22, the write command program 262 will be described.

The write command program in the third embodiment is the substantially same as the write command program 262 shown in FIG. 15, however, steps 2217 to 2219 are added.

In the step 2217, a device corresponding to write data determines whether the asynchronous remote copy function is used or not, if the function is used, secures a side file data area for the write data in the disk cache 154 and updates cache management information in the control memory (2218).

In the step 2219, the write data is stored in the side file data area in the disk cache 154 and control information such as time stamp information is stored as the cache management information.

Figure 23:
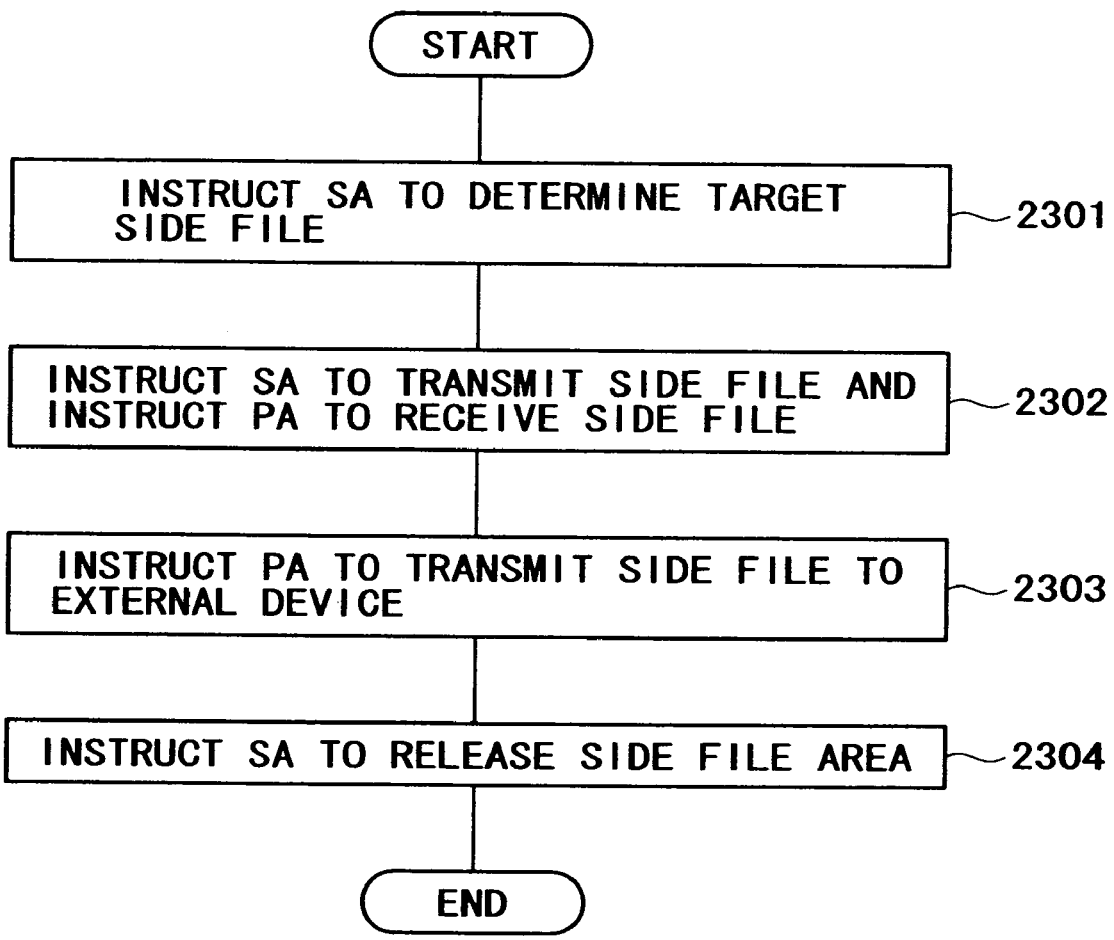
FIG. 23 is a flowchart showing a side file transmission program in the third embodiment.

FIG. 23 is an explanatory drawing for explaining a side file transmission program.

This program is processing for writing the write data stored in the side file data area in the disk cache 154 as a result of the write command program 262 in SA 150 to the second external storage 180b.

SA 150 determines side files based upon the cache management information 203 in the control memory 155 so that the side files are transmitted in order in which they are written (2301). SA 150 transmits side file data to the corresponding PA 140 together with control information such as time stamp information (2302). PA 140 that receives the side file data and the control information transmits the side file data and the control information to the corresponding external storage 180 (2303). Afterward, SA 150 releases a side file data area for the data(2304).

Fourth Embodiment

In this embodiment, SA 150 allocated to an external device to which an asynchronous remote copy function is applied is changed according to the subsequent usage of a cache memory having a side file attribute of each SA 150, accepting an I/O request to the device from a host 100.

As in fourth embodiment, the substantially similar hardware configuration and software configuration to those in the first embodiment are also premised, difference between the fourth embodiment and the first embodiment will be described below.

In the fourth embodiment, the upper logical device management information 203 shown in FIG. 17 and the lower logical device management information 201 shown in FIG. 18 respectively described in the second embodiment are used.

Figure 24:
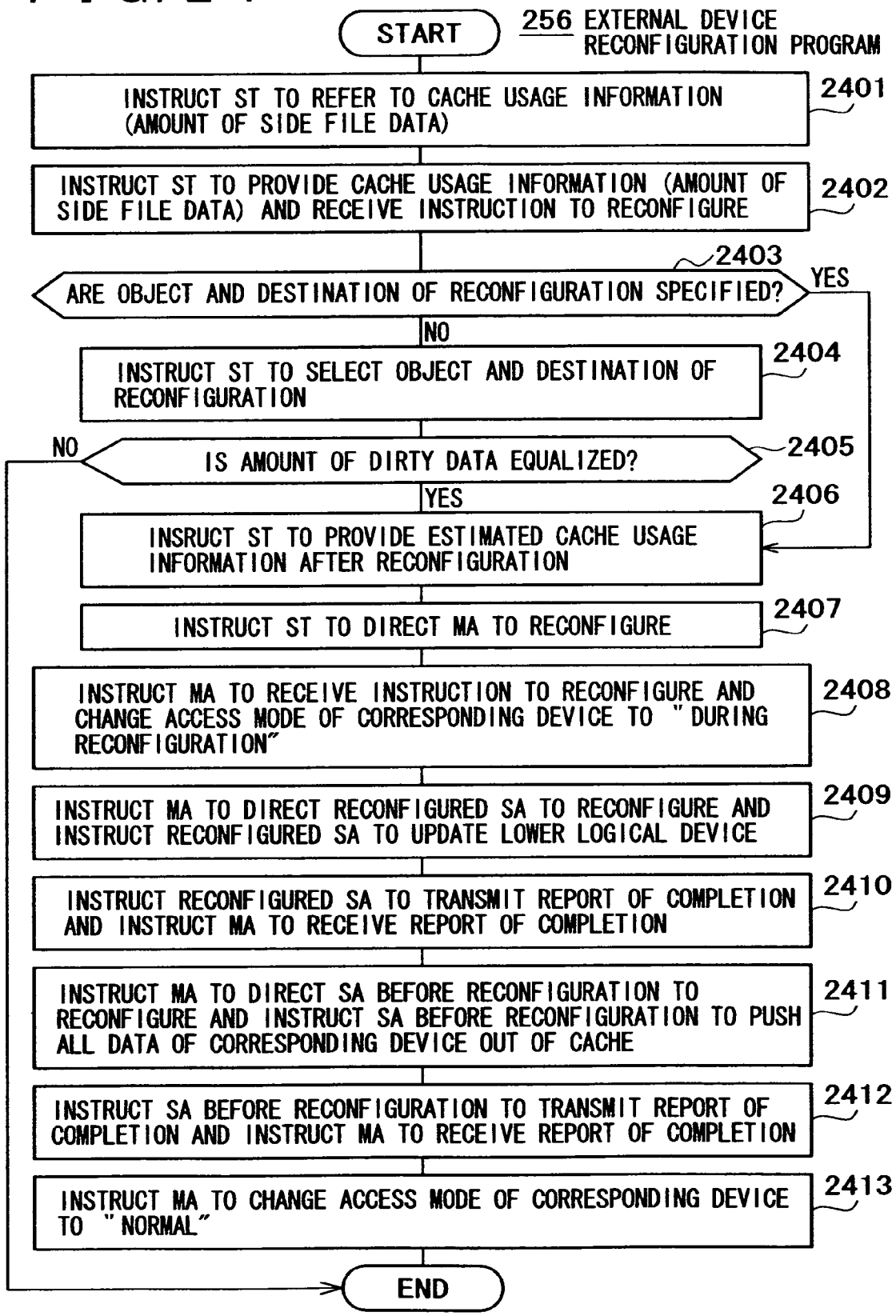
FIG. 24 is a flowchart showing an external device reconfiguration program in a fourth embodiment.

FIG. 24 is an explanatory drawing for explaining an external device reconfiguration program.

The program is processing for changing SA 150 which receives an external device reconfiguration instruction from a service terminal 190 or a management server 110 and is allocated to an external device, that is, SA 150 that processes an I/O request to the external device. FIG. 24 is substantially similar to FIG. 19 described in the second embodiment, however, steps 2401, 2402, 2404, 2405, 2406 are different.

In the step 1901, the dirty data amount information 302 and the dirty data amount information 402 are referred, while in the step 2401, ST 190 acquires the side file data amount information 303 of all SAs 150 and the side file data amount information 403 of all external devices, referring to SA cache usage information 222 and external device cache usage information 224. In reconfiguration, in the steps 2402, 2404, 2405, 2406, the similar process to that in the steps 1902, 1904, 1905, 1906 is executed using the side file data amount information in place of the dirty data amount information.

A read command program 261 in the fourth embodiment is similar to that described in the second embodiment. In the fourth embodiment, a write command program 262 acquired by changing a part of the write command program 262 described in the third embodiment is used. A changed location is equivalent to the step 2202 shown in FIG. 22 and changed contents are similar to the change described in the second embodiment of the read command program 261.

Fifth Embodiment

In the above mentioned embodiments, the example that the storage system 130 is a cluster storage system having configuration in which PA 140, SA 150 and MA 160 are connected via the internal network is described. However, the invention is not limited to the cluster storage system described above and is also applied to a cluster storage system having another configuration.

FIG. 25 shows an example of a computing system having another configuration according to the invention.

In this example, a storage system 2530 is a cluster storage system composed of plural storage nodes 2550 and an internal network 2570 for a data link between the storage nodes 2550. Each storage node 2550 is composed of one or plural disk devices 2557, a disk cache 2554, a control processor 2552, a memory 2553 and ports 2551 as in a normal storage.

This configuration example is different from the first to fourth embodiments in that SA 150 that executes a high-function-process provided by the storage system 2530 and PA 140 that allocates an I/O request a reconfigured as the storage node 2550. In this example, as the plural storage nodes 2550 are also connected via the internal network 2570, an external device can be allocated to the arbitrary storage node 2550. In this example, processing equivalent to the processing of the management adaptor 160 in the first to fourth embodiments is executed by any storage node 2550 in the storage system 2530.

A management server 2510 also functions as the service terminal 190 in the first to fourth embodiments, exchanges data with each equipment of the computing system via an interface 2516 with an IP network 2575 and collects configuration information, a resource utilization factor, performance monitoring information and others from each equipment in the computing system. The management server also displays the information on a display 2515 and provides them to a storage manager. Further, the management server transmits an instruction related to operation and maintenance input and received from an input device to each equipment. Like SA 150 in the first to fourth embodiments, the storage node 2550 collects the information of the amount of dirty data and the amount of side file data in the disk cache 2554. The management server 2510 collects the information of the amount of dirty data and the amount of side file data from each storage node 2550 and instructs the memory 2512 to hold the information. Further, the management server 2510 also manages the whole computing system including an external storage 2580.

A fibre channel switch 2520 is also connected to a port 2581 of the external storage in addition to ports 2507 of a host 2500 and ports 2551 of the storage system 2530. The other equipment plays the similar role to that in the first to fourth embodiments.

Next, a similarity and a point of difference in processing between the fifth embodiment and the first to fourth embodiments will be described. In the fifth embodiment, as hardware configuration is different from that in the first to fourth embodiments, a read/write process is thereby also different.

Concretely, in case the following I/O request can be processed in the storage node 2550 when the certain storage node 2550 receives the I/O request from the host 2500, the storage node 2550 processes the request, and in case the above mentioned I/O request is to be processed in another storage node 2550, the storage node transfers the I/O request to another storage node 2550 via the internal network 2570. Further, like SA 150 in the first to fourth embodiments, in the storage node 2550, a device of the external storage 2580 is defined as a logical device of the storage system 2530, the storage node identifies whether the I/O request from the host 2500 is access to the disk device inside the storage node or access to the external storage and allocates the request.

In this embodiment, as in the first embodiment, when the storage node 2550 that executes the processing of the external device is selected, the cache usage of the whole storage system can be equalized using the amount of dirty data of the storage node 2550.

The concrete processing contents are similar to those in the first embodiment except that the storage node 2550 executes the processing of both PA 140 and SA 150. However, the processing is different at the following points.

First, the zoning setting of the fibre channel switch 2520 shall be changed beforehand so that all the storage nodes 2550 can access to the external storage 2580. This means that any storage node can play a role as a path to the external storage and it is similar in the configuration examples in the second to fourth embodiments.

Second, setting is made so that in a logical device definition program 255, the storage node 2550 that plays a role as SA 150 simultaneously also plays a role as PA 140. This is similar to the configuration example in the third embodiment.

Further, in this embodiment, as in the second embodiment, the storage node 2550 allocated to the external device when a logical device is defined can be changed to another storage node 2550 according to the variation of the usage of the cache memory having a dirty attribute of each storage node 2550, accepting an I/O request to the external device from the host 2500.

The concrete processing contents are similar to those in the second embodiment except that the storage node 2550 executes the processing of both PA 140 and SA 150. However, the processing is different at the following points. That is, setting is made in an external device reconfiguration program 256 so that the storage node 2550 that plays a role as SA 150 simultaneously also plays a role as PA 140. This is similar to the configuration example in the fourth embodiment.

In case an asynchronous remote copy is applied to the logical device which is actually the external device in the storage node 2550 as in the third embodiment, the amount of side file data of each storage node 2550 can be also equalized by suitably selecting the storage node 2550 that executes the processing of the a synchronous remote copy using the information of the amount of side file data in each storage node 2550. The concrete processing contents are similar to those in the third embodiment except that the storage node 2550 executes the processing of both PA 140 and SA 150.

Further, in this configuration example, as in the fourth embodiment, the storage node 2550 allocated to the external device to which the asynchronous remote copy function is applied can be changed according to the subsequent usage of the cache memory having a side file attribute of each storage node 2550, accepting an I/O request to the external device from the host 2500. The concrete processing contents are similar to those in the fourth embodiment except that the storage node 2550 executes the processing of both PA 140 and SA 150.

In addition, various transformation can be performed in a range in which it does not deviate from the object of the invention.

The above mentioned fifth embodiment can be filed as follows.

(1) The storage system equivalent to the fifth embodiment is based upon a storage system provided with the interface with the host, the cache memory and the disk device for storing data read/written according to an I/O request from the host, plural storage nodes that has an interface with a first storage system and makes an I/O request to the first storage system, an internal network that connects the storage nodes and a management server that communicates with the storage node, and is characterized in that the storage system equivalent to the fifth embodiment is provided with means for providing the disk device of the first storage system and the disk device held in the storage node as a disk device which the storage system has to the host, means for processing an I/O request in the storage node in case the disk device of the storage system which is an object of access of the I/O request accepted from the host is the disk device of the storage node or the disk device of the first storage system, means for acquiring the information of the first amount of dirty data that is the total amount of write data which is in the cache memory of the storage node and which is not written to the disk device of the storage node and the disk device of the first storage system yet and means for accepting the specification of the storage node that executes the processing of the disk device of the first storage system.

(2) The storage system equivalent to the fifth embodiment is based upon the storage system described in above (1) and is characterized in that in case the storage node that executes the processing of the disk device of the first storage system in a second storage system is not specified by the management server, the storage node that executes the processing of the disk device of the first storage system is determined using the first amount of dirty data.

(3) The storage system equivalent to the fifth embodiment is based upon the storage system described in above (2) and is characterized in that switching means for changing the storage node that executes the processing of the disk device of the first storage system from a first storage node to a second storage node is provided.

(4) The storage system equivalent to the fifth embodiment is based upon the storage system described in above (3) and is characterized in that data which is in the cache memory of the storage node and which is in the disk device of the first storage node is retrieved, data not written to the disk device of the first storage system yet is written to the disk device of the first storage system and a cache memory area is released.

(5) The storage system equivalent to the fifth embodiment is based upon the storage system described in above (4) and is characterized in that a third storage node allocates an I/O request to the disk device of the first storage node from the host to the second storage node in the case of the I/O request to a part in which switching is finished in the disk device of the first storage node and to the first storage node in the case of the I/O request to a part in which switching is not finished.

(6) The storage system equivalent to the fifth embodiment is based upon the storage system described in above (3) and is characterized in that the storage system equivalent to the fifth embodiment is provided with means for acquiring the information of the second amount of dirty data which is the amount of write data that is in the cache memory of the storage node and is not transmitted to the disk device of the first storage system yet and means for providing the information of the first amount of dirty data and the information of the second amount of dirty data to the disk device of the first storage system to the management server and accepting the specification of the disk device of the first storage system which is an object of switching and the specification of the second storage node which is a destination of switching.

(7) The storage system equivalent to the fifth embodiment is based upon the storage system described in above (6) and is characterized in that in case the disk device of the first storage system which is the object of switching and the second storage node which is the destination of switching are not specified, the disk device of the first storage system which is the object of switching and the second storage node which is the destination of switching are determined using the first amount of dirty data and the second amount of dirty data.

(8) The storage system equivalent to the fifth embodiment is based upon the storage system described in above (1) and is characterized in that the storage system equivalent to the fifth embodiment having an interface with a third storage system, including a fourth storage node that executes a copy process of the third storage system and having a function for duplicating the disk device in the storage node in a disk device of the third storage system, successively storing write data to the disk device in the storage node in the cache memory of the storage node and transmitting the write data to the disk device of the third storage system is provided with means for acquiring the information of the first amount of side file data which is the total amount of write data that is in the cache memory of the storage node and is not written to the third storage system yet, the information of the first amount of side file data is provided to the management server and the storage node that executes the processing of the disk device of the first storage system is specified.

(9) The storage system equivalent to the fifth embodiment is based upon the storage system described in above (8) and is characterized in that in case the storage node that executes the processing of the disk device of the first storage system is not specified, the storage node that executes the processing of the disk device of the first storage system is determined using the information of the first amount of side file data.

(10) The storage system equivalent to the fifth embodiment is based upon the storage system described in above (8) and is characterized in that the storage node that executes a process for providing the disk device of the first storage system to the host is changed from the first storage node to the second storage node.

(11) The storage system equivalent to the fifth embodiment is based upon the storage system described in above (10) and is characterized in that means for acquiring the information of the second amount of side file data which is the amount of data that is in the cache memory of the storage node and is not written to the disk device of the third storage system yet is provided, the information of the first amount of side file data and the information of the second amount of side file data are provided to the management server and the specification of the disk device of the first storage system which is an object of switching and the second storage node which is a destination of switching is accepted.

(12) The storage system equivalent to the fifth embodiment is based upon the storage system described in above (11) and is characterized in that in case the disk device of the first storage system which is an object of switching and the second storage node which is a destination of switching are not specified, the disk device of the first storage system which is the object of switching and the second storage node which is the destination of switching are determined using the information of the first amount of side file data and the information of the second amount of side file data.

What is claimed is:

1. A storage system comprising:
    plural storage adaptors, each of which is provided with a cache memory that stores data according to a request from a host;
    an external storage coupled to said plural storage adapters, said external storage including at least one logical device that handles data and an external cache memory to one of said storage adaptors; and
    a monitoring computer coupled to said storage adapters, said monitoring computer configured to collect usage information relating to said cache memories of said plural storage adapters,
    wherein said at least one logical device of said external storage is selected based on said usage situation of said cache memory and is controlled by one of said plural storage adaptors,
    wherein said monitoring computer is further configured to acquire for each of said cache memories a first dirty data amount indicative of how much first dirty data is stored in said each of said cache memories and to select, based on said first dirty data amounts, a first storage adaptor having the smallest amount of dirty data, wherein said first storage adaptor serves to control said at least one logical device of said external storage.

2. The storage system according to claim 1, wherein:
    said monitoring computer is further configured to acquire a second dirty data amount indicative of how much second dirty data is stored in said at least one logical device, wherein said second dirty data is also stored among said cache memories of said storage adaptors,
    said monitoring computer is further configured to select said storage adaptor for controlling said at least one logical device logical device based upon said first dirty data amount and said second dirty data amount.

3. The storage system according to claim 1, wherein said first storage adaptor is configured to:
perform an asynchronous remote copy of said data stored in said at least one logical device to another storage; and
acquire an amount indicative of how much side file data is contained in said cache memory of said storage adaptor which has not yet been transmitted to said other storage,
wherein said monitoring computer is further configured to select said storage adaptor for controlling said at least one logical device of said external storage based on said amount of side file data.

4. The storage system according to claim 3, further comprising:
a management apparatus coupled to said monitoring computer and configured to execute an instruction for selecting said storage adaptor received from said monitoring computer,
wherein said storage adaptor transfers said usage information of said cache memory, said dirty data amount or said amount of side file data to said monitoring computer,
wherein said management apparatus executes said instruction received from said monitoring computer.

5. The storage system according to claim 1, further comprising:
a management apparatus coupled to said monitoring computer and configured to execute an instruction for selecting said storage adaptor received from said monitoring computer,
wherein said storage adaptor transfers said usage information of said cache memory, said dirty data amount to said monitoring computer,
wherein said management apparatus executes said instruction received from said monitoring computer.

6. A storage system having a cluster configuration, comprising:
plural storage nodes, each of which is provided with a cache memory that temporarily stores read/written data according to an I/O (input/output) request from a host and a device that holds said data of said cache memory;
an interface for connecting an external storage provided with an external cache memory that stores read/written data according to an I/O request from said host and an external device coupled to said plural storage nodes;
a monitor configured to monitor and acquire a usage situation of each of said cache memories of said plural storage nodes; and
a selector configured to select a storage node so that usage of said cache memories is equalized, based on information of said usage situation of said cache memories,
wherein said external device of said external storage is controlled by said selected storage node via said interface,
wherein said monitor is further configured to acquire a dirty data quantity for each of said cache memories; and
said selector is further configured to select said storage node having the smallest amount of dirty data based upon said acquired dirty data quantities.

7. The storage system according to claim 6, further comprising a program module configure to perform an asynchronous remote copy operation from a second storage including said plural storage nodes to a third storage, said storage system configured to acquire a data amount indicative of the amount of side file data held in said cache memory of said storage node that has not yet been transmitted to said third storage,
wherein said selector is further configured to select said storage node based on said data amount.

8. The storage system according to claim 7, wherein said usage situation of said cache memory, said dirty data quantity or said data amount is displayed on a service terminal or a management server to provide it to a manager, wherein said selector is configured to select said storage node based on information from said service terminal or said management server.

9. The storage system according to claim 6, wherein said usage situation of said cache memory, said dirty data quantity is displayed on a service terminal or a management server to provide it to a manager, wherein said selector is configured to select said storage node based on information from said service terminal or said management server.

10. A storage system having a cluster configuration, comprising:
plural storage adaptors each of which is provided with a cache memory that stores read/written data according to an I/O (input/output) request from a host and a device that holds said data stored in said cache memory;
means for connecting an external storage having a logical device that handles read/written data and an external cache memory to one of said plural storage adaptors;
means for monitoring and for grasping a usage situation of said cache memories of said plural storage adaptors; and
selection means for referring to information of said usage situation of said cache memories acquired by said grasping means and for selecting any of said storage adaptors so that usage of said cache memories is equalized, wherein:
said logical device of said external storage is controlled by said storage adaptor selected by said selection means via said connection means, wherein:
said grasping means acquire an amount of dirty data (a first amount of dirty data) for each of said cache memories of said plural storage adaptors;
said selection means select said storage adaptor having a smaller amount of dirty data based upon said acquired amount of dirty data and controls said logical device of said external storage;
said grasping means further grasp an amount of dirty data (a second amount of dirty data), which is data to be stored in said logical device of said external storage and which is stored in said cache memory with which any of said storage adaptors is provided; and
said selection means select said storage adaptor for controlling said logical device of said external storage based upon said first amount of dirty data and said second amount of dirty data.

* * * * *

UNITED STATES PATENT AND TRADEMARK OFFICE
CERTIFICATE OF CORRECTION

PATENT NO.         : 7,464,223 B2
APPLICATION NO. : 11/654050
DATED                 : December 9, 2008
INVENTOR(S)       : Watanabe et al.

It is certified that error appears in the above-identified patent and that said Letters Patent is hereby corrected as shown below:

Cover Page:

In the bibliographic data, at code (75),

"Inventors:    Yasuo Watanabe, Tokyo (JP);
                    Yasutomo Yamamoto, Tokyo (JP);
                    Kazuhisa Fujimoto, Tokyo (JP)"

Should read,

--Inventors:    Yasuo Watanabe, Kawasaki (JP);
                    Yasutomo Yamamoto, Sagamihara (JP);
                    Kazuhisa Fujimoto, Kokubunji (JP)--

Signed and Sealed this

Twenty-first Day of April, 2009

JOHN DOLL
*Acting Director of the United States Patent and Trademark Office*